US011377526B2

(12) United States Patent
Herring et al.

(10) Patent No.: US 11,377,526 B2
(45) Date of Patent: Jul. 5, 2022

(54) HIGH PERFORMANCE CROSS-LINKED TRIBLOCK CATIONIC FUNCTIONALIZED POLYMER FOR ELECTROCHEMICAL APPLICATIONS, METHODS OF MAKING AND METHODS OF USING

(71) Applicants: Colorado School of Mines, Golden, CO (US); University of Massachusetts, Boston, MA (US)

(72) Inventors: Andrew M. Herring, Boulder, CO (US); Mei-Chen Kuo, Denver, CO (US); E. Bryan Coughlin, Amherst, MA (US); Nora Buggy, Golden, CO (US); Yifeng Du, Amherst, MA (US)

(73) Assignees: Colorado School of Mines, Golden, CO (US); University of Massachusetts, Boston, MA (US)

( * ) Notice: Subject to any disclaimer, the term of this patent is extended or adjusted under 35 U.S.C. 154(b) by 0 days.

(21) Appl. No.: 17/096,483

(22) Filed: Nov. 12, 2020

(65) Prior Publication Data
US 2021/0171725 A1    Jun. 10, 2021

Related U.S. Application Data

(63) Continuation of application No. 16/150,113, filed on Oct. 2, 2018, now Pat. No. 10,836,874.

(60) Provisional application No. 62/567,038, filed on Oct. 2, 2017.

(51) Int. Cl.
| | | |
|---|---|---|
| *C08F 299/00* | (2006.01) | |
| *C08F 232/00* | (2006.01) | |
| *C08F 8/04* | (2006.01) | |
| *C08F 8/32* | (2006.01) | |
| *C08J 3/24* | (2006.01) | |
| *C08J 3/28* | (2006.01) | |
| *C08F 212/36* | (2006.01) | |
| *C08F 212/12* | (2006.01) | |
| *C08K 5/3435* | (2006.01) | |
| *C08K 5/3415* | (2006.01) | |
| *C08K 5/19* | (2006.01) | |
| *C08C 19/22* | (2006.01) | |
| *C08J 7/12* | (2006.01) | |
| *B01D 71/82* | (2006.01) | |
| *C08F 8/44* | (2006.01) | |
| *C08F 8/34* | (2006.01) | |
| *C08F 8/40* | (2006.01) | |
| *B01D 71/80* | (2006.01) | |
| *C08F 8/26* | (2006.01) | |

(52) U.S. Cl.
CPC ............. *C08J 3/246* (2013.01); *B01D 71/80* (2013.01); *B01D 71/82* (2013.01); *C08C 19/22* (2013.01); *C08F 8/04* (2013.01); *C08F 8/32* (2013.01); *C08F 8/34* (2013.01); *C08F 8/40* (2013.01); *C08F 8/44* (2013.01); *C08F 212/12* (2013.01); *C08F 212/36* (2013.01); *C08F 232/00* (2013.01); *C08F 299/00* (2013.01); *C08J 3/24* (2013.01); *C08J 3/28* (2013.01); *C08J 7/12* (2013.01); *C08K 5/19* (2013.01); *C08K 5/3415* (2013.01); *C08K 5/3435* (2013.01); *B01D 2323/30* (2013.01); *B01D 2325/48* (2013.01); *C08F 8/26* (2013.01); *C08F 2438/02* (2013.01); *C08F 2438/03* (2013.01); *C08F 2810/20* (2013.01); *C08J 2325/16* (2013.01); *C08J 2325/18* (2013.01); *C08J 2353/00* (2013.01)

(58) Field of Classification Search
CPC ........ B01D 71/82; C08F 8/04; C08F 297/046; C08F 297/04
See application file for complete search history.

(56) References Cited

U.S. PATENT DOCUMENTS

| | | | |
|---|---|---|---|
| 5,242,986 A | 9/1993 | Gibler et al. | |
| 5,550,005 A | 8/1996 | Berber et al. | |
| 6,423,784 B1 | 7/2002 | Hamrock et al. | |
| 2010/0222208 A1* | 9/2010 | Matsuoka | H01M 8/1067 521/30 |
| 2015/0017566 A1* | 1/2015 | Watanabe | H01M 4/8668 429/480 |
| 2019/0118144 A1* | 4/2019 | Kishino | B01J 39/20 |

FOREIGN PATENT DOCUMENTS

WO    WO 2009/083509    7/2009

OTHER PUBLICATIONS

Arges et al., "The Chalkboard: Anion Exchange Membrane Fuel Cells," The Electrochemical Society Interface, vol. 19, No. 2, Summer 2010, pp. 31-35.
Assem et al., "Microwave-Assisted Controlled Ring-Closing Cyclopolymerization of Diallyldimethylammonium Chloride Via the RAFT Process," Macromolecular Rapid Communications, vol. 28, No. 18-19, Sep. 2007 pp. 1923-1928, abstract only.

(Continued)

*Primary Examiner* — Jeffrey C Mullis

(74) *Attorney, Agent, or Firm* — Sheridan Ross P.C.

(57) ABSTRACT

The present invention relates to a high performance cross-linked triblock cationic functionalized polymer for electrochemical applications, and methods of making and using the same. The invention also relates to a tunable hydrogenated polymer, that can be functionalized with a particular cation for a particular application, and the method of making the hydrogenated polymer and tuning the hydrogenated polymer for the application.

4 Claims, 29 Drawing Sheets

(56) References Cited

OTHER PUBLICATIONS

Baker et al., "Cerium Ion Mobility and Diffusivity Rates in Perfluorosulfonic Acid Membranes Measured via Hydrogen Pump Operation." Journal of the Electrochemical Society, vol. 164, No. 12, 2017, pp. F1272-F1278.

Baker et al., "Cerium Migration during PEM Fuel Cell Accelerated Stress Testing," Journal of the Electrochemical Society, vol. 163, No. 9, 2016, pp. F1023-F1031.

Baker et al., "Zr-doped ceria additives for enhanced PEM fuel cell durability and radical scavenger stability," Journal of Materials Chemistry A, vol. 5, No. 29, pp. 15073-15079.

Banham et al., "UV-visible spectroscopy method for screening the chemical stability of potential antioxidants for proton exchange membrane fuel cells," Journal of Power Sources, vol. 281, May 2015, pp. 238-242, abstract only.

Bates et al., "Block Copolymer Thermodynamics: Theory and Experiment," Annual Review of Physical Chemistry, vol. 41, 1990, pp. 525-557.

Bauer et al., "Anion-exchange membranes with improved alkaline stability," Desalination, vol. 79, No. 2-3, Dec. 1990, pp. 125-144, abstract only.

Blinco et al., "Living characteristics of the free-radical ring-closing polymerization of diallyldimethylammonium chloride," European Polymer Journal, vol. 47, No. 1, Jan. 2011, pp. 111-114, abstract only.

Borup et al., "Scientific Aspects of Polymer Electrolyte Fuel Cell Durability and Degradation," Chemical Reviews, vol. 107, No. 10, 2007, pp. 3904-3951.

Brooker et al., "Decreasing Membrane Degradation through Heteropolyacid Sub-layers," Journal of the Electrochemical Society, vol. 160, No. 1, 2013, pp. F75-F80, abstract only.

Bultmann et al., "Competition between Geminate Recombination and Solvation of Polar Radicals following Ultrafast Photodissociation of Bis(p-aminophenyl) Disulfide," Journal of Physical Chemistry, vol. 100, No. 50, 1996, pp. 19417-19424, abstract only.

Butler et al., "Preparation and Polymerization of Unsaturated Quaternary Ammonium Compounds," Journal of the American Chemical Society, vol. 71, No. 9, 1949, pp. 3120-3122, abstract only.

Butler et al., "Preparation and Polymerization of Unsaturated Quaternary Ammonium Compounds. VIII. A Proposed Alternating Intramolecular-Intermolecular Chain Propagation," Journal of the American Chemical Society, vol. 79, No. 12, pp. 3128-3131, abstract only.

Butler, "Cyclopolymerization," Polymer Chemistry, vol. 38, No. 19, Oct. 2000, pp. 3451-3461.

Caire et al., "Mechanical testing of small, thin samples in a humidity-controlled oven," Rheotogica Acta, vol. 54, No. 4, Apr. 2014, pp. 253-261, abstract only.

Chen et al., "Dual role study of 12-molybdophosphoric acid on styrene polymerization," Journal of Molecular Catalysis A, vol. 208, No. 1-2, Feb. 2004, pp. 91-95, abstract only.

Cheng et al., "A mini-review on anion exchange membranes for fuel cell applications: Stability issue and addressing strategies." International Journal of Hydrogen Energy, vol. 40, No. 23, May 4, 2015, pp. 7348-7360.

Clouet et al., "Free radical synthesis of α,ω-primary amino functionalized polyisoprene through the functional thermal inferter [bis(N-(2-phthalimidoethyl)piperazine)]thiuram disulfide," Macromolecular Chemistry and Physics, vol. 195, No. 1, Jan. 1994, pp. 243-251, abstract only.

Curtin et al., "Advanced materials for improved PEMFC performance and life," Journal of Power Sources, vol. 131, No. 1-2, May 2004, pp. 41-48.

Dang et al., "Alkali-stable and highly anion conducting poly(phenylene oxide)s carrying quaternary piperidinium cations," Journal of Materials Chemistry A, vol. 4. No. 30, 2016, pp. 11924-11938. abstract only.

Destarac et al., "Aqueous MADIX/RAFT polymerization of diallyldimethylammonium chloride: Extension to the synthesis of poly(DADMAC)-based double hydrophilic block copolymers," Journal of Polymer Science A, vol. 48, No. 22, Nov. 2010, pp. 5163-5171, abstract only.

Dizman et al., "Recent advances in the preparation of functionalized polysulfones," Polymer International, vol. 62, 2013, pp. 991-1007, abstract only.

Duncan et al., "Mechanism and Dynamics in the H3[PW12O40]-Catalyzed Selective Epoxidation of Terminal Olefins by H2O2. Formation, Reactivity, and Stability of {PO4[WO(O2)2]4}3-," Journal of the American Chemical Society, vol. 117, No. 2, 1995, pp. 681-691, abstract only.

Edson et al., "Thianthrene as an activating group for the synthesis of poly(aryl ether thianthrene)s by nucleophilic aromatic substitution," Journal of Polymer Science A, vol. 42, No. 24, Dec. 2004, pp. 6353-6363, abstract only.

Ertem et al., "Photo-Cross-Linked Anion Exchange Membranes with Improved Water Management and Conductivity," Macromolecules, vol. 49, No. 1, 2016, pp. 153-161.

Fischer et al., "Poly(diallyldimethylammonium chlorides) and their N-methyl-N-vinylacetamide copolymer-based DNA-polyplexes: role of molecular weight and charge density in complex formation, stability, and in vitro activity," International Journal of Pharmaceutics, vol. 280, No. 1-2, Aug. 2004, pp. 253-269, abstract only.

Ghassemi et al., "Multiblock sulfonated-fluorinated poly(arylene ether)s for a proton exchange membrane fuel cell," Polymer, vol. 47, No. 11, May 2006, pp. 4132-4139, abstract only.

Gu et al., "Base Stable Pyrrolidinium Cations for Alkaline Anion Exchange Membrane Applications," Macromolecules, vol. 47, No. 19, 2014, pp. 6740-6747, abstract only.

Gu et al., "Quaternary Phosphonium-Based Polymers as Hydroxide Exchange Membranes," ChemSusChem, vol. 3, No. 5, May 2010, pp. 555-558, abstract only.

Gubler et al., "Kinetic Simulation of the Chemical Stabilization Mechanism in Fuel Cell Membranes Using Cerium and Manganese Redox Couples," Journal of the Electrochemical Society, vol. 159, No. 2, 2012, pp. B211-B218.

Haugen et al., "The Effect of Heteropoly Acids on Stability of PFSA PEMs under Fuel Cell Operation," Electrochemical and Solid-State Letters, vol. 10, No. 3, 2007, pp. B51-B55, abstract only.

He et al., "Dual-cation comb-shaped anion exchange membranes: Structure, morphology and properties," Journal of Membrane Science, vol. 515, Oct. 2016, pp. 189-195, abstract only.

Herring et al., "Inorganic-Polymer Composite Membranes for Proton Exchange Membrane Fuel Cells," Journal of Macromolecular Science C, vol. 46, No. 3, 2006, pp. 245-296, abstract only.

Hibbs et al., "Synthesis and Characterization of Poly(phenylene)-Based Anion Exchange Membranes for Alkaline Fuel Cells," Macromolecules, vol. 42, No. 21, 2009, pp. 8316-8321, abstract only.

Horan et al., "Cover Picture: Copolymerization of Divinylsilyl-11-silicotungstic Acid with Butyl Acrylate and Hexanediol Diacrylate: Synthesis of a Highly Proton-Conductive Membrane for Fuel-Cell Applications (ChemSusChem Mar. 2009)," ChemSusChem, vol. 2, No. 3, Mar. 2009, p. 193, abstract only.

Horan et al., "Fast Proton Conduction Facilitated by Minimum Water in a Series of Divinylsilyl-11-silicotungstic Acid-co-Butyl Acrylate-co-Hexanediol Diacrylate Polymers," Journal of Physical Chemistry C, vol. 118, No. 1, 2014, pp. 135-144.

Hossain et al., "Comparison of alkaline fuel cell membranes of random & block poly(arylene ether sulfone) copolymers containing tetra quaternary ammonium hydroxides," International Journal of Hydrogen Energy, vol. 39, No. 6, Feb. 2014, pp. 2731-2739, abstract only.

Hugar et al., "Imidazolium Cations with Exceptional Alkaline Stability: A Systematic Study of Structure-Stability Relationships," Journal of the American Chemical Society, vol. 137, 2015, pp. 8730-8737.

James et al., "Hydration of Nafion® studied by AFM and X-ray scattering," Journal of Materials Science, vol. 35, No. 20, Oct. 2000, pp. 5111-5119, abstract only.

(56) References Cited

OTHER PUBLICATIONS

Janik et al., "A Quantum Chemical Study of the Decomposition of Keggin-Structured Heteropolyacids," Journal of Physical Chemistry 8, vol. 110, No. 9, 2006, pp. 4170-4178, abstract only.
Jannasch et al., "Configuring Anion-Exchange Membranes for High Conductivity and Alkaline Stability by Using Cationic Polymers with Tailored Side Chains," Macromolecular Chemistry and Physics, vol. 217, No. 10, May 2016, pp. 1108-1118, abstract only.
Jouannet et al., "Calorimetric study of fluorinated methacrylic and vinyl polymer blends: 1. Binary systems: determination of miscibility domains and correlation of glass transition temperatures with blends composition— application to plastic optical fibre cladding," Polymer, vol. 38, No. 2, Sep. 1997, pp. 5137-5147, abstract only.
Jun et al., "Reinvestigation of Photoinitiation Mechanism and Kinetics of Aryl Disulfides," Journal of Photopolymer Science and Technology, vol. 8, No. 1, 1995, pp. 155-162.
Kamata et al., "Efficient Epoxidation of Olefins with >99% Selectivity and Use of Hydrogen Peroxide," Science, vol. 300, No. 5621, May 2003, pp. 964-966.
Karibyants et al., "Characterization of PSS/PDADMAC-co-AA Polyelectrolyte Complexes and Their Stoichiometry Using Analytical Ultracentrifugation," Macromolecules, vol. 30, No. 25, 1997, pp. 7803-7809, abstract only.
Kilcher et al., "Role of thiol-disulfide exchange in episulfide polymerization," Journal of Polymer Science A, vol. 46, No. 6, Mar. 2008, pp. 2233-2249, abstract only.
Kim et al., "Synthesis, structure, spectroscopic properties, and hydrolytic chemistry of organophosphonoyl polyoxotungstates of formula [C6H5P(O)]2Xn+W11O39(8-n)-(Xn+ = P5+, Si4+)," Inorganic Chemistry, vol. 31, No. 25, 1992, pp. 5316-5324, abstract only.
Klingele et al., "Direct deposition of proton exchange membranes enabling high performance hydrogen fuel cells," Journal of Materials Chemistry A, vol. 3, No. 21, 2015, pp. 11239-11245.
Knauss et al., "Poly(aryl ether sulfide)s by sulfide-activated nucleophilic aromatic substitution polymerization," Polymer, vol. 47, No. 11, May 2006, pp. 3996-4003, abstract only.
Kobayashi et al., "Ring-opening copolymerization of 2,4-bisphenyl-1,3,2,4-dioxadiphosphetane-2,4-dioxide with oxetane via zwitterion intermediates," Polymer bulletin, vol. 16, No. 4, Oct. 1986, pp. 269-276, abstract only.
Kodaira, "Structural control during the cyclopolymerization of unconjugated dienes," Progress in Polymer Science, vol. 25, No. 5, Jun. 2000, pp. 627-676, abstract only.
Kong et al., "Determination of the Structure of a Novel Anion Exchange Fuel Cell Membrane by Solid-State Nuclear Magnetic Resonance Spectroscopy," Macromolecules, vol. 42, No. 5, 2009, pp. 1659-1664, abstract only.
Kongkanand et al., "The Priority and Challenge of High-Power Performance of Low-Platinum Proton-Exchange Membrane Fuel Cells," Journal of Physical Chemistry Letters, vol. 7, No. 7, 2016, pp. 1127-1137, abstract only.
Kundu et al., "Morphological features (defects) in fuel cell membrane electrode assemblies," Journal of Power Sources, vol. 157, No. 2, Jul. 2006, pp. 650-656, abstract only.
Kusoglu et al., "Electrochemical/Mechanical Coupling in Ion-Conducting Soft Matter," Journal of Physical Chemistry Letters, vol. 6, No. 22, 2015, pp. 4547-4552.
Kusoglu et al., "New Insights into Perfluorinated Sulfonic-Acid Ionomers," Chemical Reviews, vol. 117, No. 3, 2017, pp. 987-1104.
Lalevee et al., "Thiyl Radical Generation in Thiol or Disulfide Containing Photosensitive Systems," Macromolecular Chemistry and Physics, vol. 210, No. 5, Mar. 2009, pp. 311-319, abstract only.
Lancaster et al., "The structure of poly(diallyldimethyl-ammonium) chloride by 13C-NMR spectroscopy," Polymer Letters, vol. 14, No. 9, Sep. 1976, pp. 549-554, abstract only.
Lee et al., "Hydrophilic-Hydrophobic Multiblock Copolymers Based on Poly(aryiene ether sulfone) via Low Temperature Coupling Reactions for Proton Exchange Membrane Fuel Cells," Polymer, vol. 49, No. 3, 2008, pp. 715-723.
Lee et al., "Morphological transformation during cross-iinking of a highly sulfonated poly(phenylene sulfide nitrile) random copolymer," Energy & Environmental Science, vol. 5, No. 12, 2012, pp. 9795-9802, abstract only.
Leibler, "Theory of Microphase Separation in Block Copolymers," Macromolecules, vol. 13, No. 6, 1980, pp. 1602-1617, first page only.
Li et al., "A new class of highly-conducting polymer electrolyte membranes: Aromatic ABA triblock copolymers," Energy & Environmental Science, vol. 5, No. 1, 2012, pp. 5346-5355.
Li et al., "Poly(2,6-dimethyl-1,4-phenylene oxide) Blended with Poly(vinylbenzyl chloride)-b-polystyrene for the Formation of Anion Exchange Membranes," Macromolecules, vol. 47, No. 19, 2014, pp. 6757-6767, abstract only.
Li et al., "Polyethylene-Based Block Copolymers for Anion Exchange Membranes," Macromolecules, vol. 48, No. 18, 2015, pp. 6523-6533, abstract only.
Li et al., "Synthesis and properties of anion conductive multiblock copolymers containing tetraphenyl methane moieties for fuel cell application," Journal of Membrane Science, vol. 436, Jun. 2013, pp. 202-212, abstract only.
Li et al., "Synthesis and properties of multiblock ionomers containing densely functionalized hydrophilic blocks for anion exchange membranes," Journal of Membrane Science, vol. 467, 2014, pp. 1-12, abstract only.
Liu et al., "A Small-Angle X-ray Scattering Study of the Development of Morphology in Films Formed from the 3M Perfluorinated Sulfonic Acid Ionomer," Macromolecules, vol. 45, No. 18, 2012, pp. 7495-7503, abstract only.
Liu et al., "Anion exchange membranes composed of a poly(2,6-dimethyl-1,4-phenylene oxide) random copolymer functionalized with a bulky phosphonium cation," Journal of Membrane Science, vol. 506, No. C, 2016, 38 pages.
Liu et al., "Anion Transport in a Chemically Stable, Sterically Bulky α-C Modified Imidazolium Functionalized Anion Exchange Membrane." Journal of Physical Chemistry C, vol. 118, No. 28, 2014, pp. 15136-15145.
Logothetis et al., "Chemistry of fluorocarbon elastomers," Progress In Polymer Science, vol. 14, No. 2, 1989, pp. 251-296, abstract only.
Macomber et al., "Decomposition pathways of an alkaline fuel cell membrane material component via evolved gas analysis," Journal of Thermal Analysis and Calorimetry, vol. 93, No. 1, Jul. 2008, pp. 225-229, abstract only.
Malers et al., "Studies of heteropoly acid/polyvinylidenedifluoride-hexafluoroproylene composite membranes and implication for the use of heteropoly acids as the proton conducting component in a fuel cell membrane," Journal of Power Sources, vol. 172, No. 1, Oct. 2007, pp. 83-88, abstract only.
Marino et al., "Alkaline Stability of Quaternary Ammonium Cations for Alkaline Fuel Cell Membranes and Ionic Liquids," ChemSusChem, vol. 8, No. 3, Feb. 2015, pp. 513-523.
Matsumoto, "Polymerization of multiallyl monomers," Progress in Polymer Science, vol. 26. No. 2, Mar. 2001, pp. 189-257, abstract only.
Maurya et al., "Stability of composite anion exchange membranes with various functional groups and their performance for energy conversion," Journal of Membrane Science, vol. 443, Sep. 2013, pp. 28-35, abstract only.
Mayer et al., "Organic-Inorganic Hybrids Based on Polyoxometalates. 5.1 Synthesis and Structural Characterization of Bis(organophosphorvl)decatungstosilicates [γ-SiW10O36((RPO)2]4-," Inorganic Chemistry, vol. 38, No. 26, 1999, pp. 6152-6158, abstract only.
Meek et al., "Alkaline Chemical Stability and Ion Transport in Polymerized Ionic Liquids with Various Backbones and Cations," Macromolecules, vol. 49, No. 9, 2016, pp. 3382-3394, abstract only.
Meng et al., "Synthesis of macrocyclic aliphatic disulfide oligomers from dithiols by oxidative coupling with oxygen using a copper-amine catalyst," Polymers for Advanced Technologies, vol. 15, No. 9, Sep. 2004, pp. 564-566, abstract only.
Merle et al., "Anion exchange membranes for alkaline fuel cells: A review," Journal of Membrane Science, vol. 377, No. 1-2, Jul. 2011, pp. 1-35.

(56) References Cited

OTHER PUBLICATIONS

Morgan et al., "Studies on the Synthesis, Stability and Conformation of 2-Sulfonyl-Oxetane Fragments," Organic & Biomolecuiar Chemistry, vol. 13, 2015, pp. 5265-5272.

Motz et al., "Synthesis of a Polymer Electrolyte Based on Silicotungstic Acid, Performance, and Mechanical Durability in a Proton Exchange Membrane Fuel Cell," ECS Transactions, vol. 80, No. 8, 2017, pp. 565-570, abstract only.

Nakamura et al., "High-Conductivity Solid Proton Conductors: Dodecamolybdophosphoric Acid and Dodecatungstophosphoric Acid Crystals," Chemistry Letters, vol. 8, No. 1, 1979, pp. 17-18.

Neelakandan et al., "Fabrication and electrochemical properties of surface modified sulfonated poly(vinylidenefluoride-co-hexafluoropropylene) membranes for DMFC application," Solid State Ionics, vol. 268, Pt. A, Dec. 2014, pp. 35-41, abstract only.

Negi et al., "Cyclopolymerization of diallylamine derivatives in dimethyl sulfoxide," Journal of Polymer Science A, vol. 5, No. 8, Aug. 1967, pp. 1951-1965, abstract only.

Noonan et al., "Phosphonium-Functionalized Polyethylene: A New Class of BaseStable Alkaline Anion Exchange Membranes," Journal of the American Chemical Society, vol. 134, No. 44, 2012, pp. 18161-18164.

Nunez et al., "N-Alkyl Interstitial Spacers and Terminal Pendants Influence the Alkaline Stability of Tetraalkylammonium Cations for Anion Exchange Membrane Fuel Cells," Chemistry of Materials, vol. 28, No. 8, 2016, pp. 2589-2598, abstract only.

Ohma et al., "Membrane Degradation Behavior during Open-Circuit Voltage Hold Test," Journal of the Electrochemical Society, vol. 154, No. 8, 2007, pp. B757-B760, abstract only.

Ohma et al., "Membrane degradation mechanism during open-circuit voltage hold test," Journal of Power Sources, vol. 182, No. 1, Jul. 2008, pp. 39-47, abstract only.

Otsu, "Iniferter concept and living radical polymerization," Journal of Polymer Chemistry, vol. 38, No. 12, Jun. 2000, pp. 2121-2136.

Pandey et al., "A Highly Hydroxide Conductive, Chemically Stable Anion Exchange Membrane, Poly(2,6 dimethyl 1,4 phenylene oxide)-b-Poly(vinyl benzyl trimethyl ammonium), for Electrochemical Applications," Journal of the Electrochemical Society, vol. 163, No. 7, 2016, pp. H513-H520.

Pandey et al., "Insight on Pure vs Air Exposed Hydroxide Ion Conductivity in an Anion Exchange Membrane for Fuel Cell Applications," ECS Transactions, vol. 64, No. 3, Oct. 2014, pp. 1195-1200.

Pandey et al., "Interplay between water uptake, ion interactions, and conductivity in an e-beam grafted poly(ethylene-co-tetrafluoroethylene) anion exchange membrane," Physical Chemistry Chemical Physics, vol. 17, No. 6, 2015, pp. 4367-4378.

Pandey et al., "Novel Processing of a Poly(phenyleneoxide)-b-Poly(vinylbenzyltrimethylammonium) Copolymer Anion Exchange Membrane; The Effect On Mechanical And Transport Properties," Electrochimica Acta, vol. 222, 2016, pp. 1545-1554, abstract only.

Pham et al., "Aromatic Polymers Incorporation Bis-N-spirocyclic Quaternary Ammonium Moieties for Anion-Exchange Membranes," ACS Macro Letters, vol. 4, No. 12, 2015, pp. 1370-1375, abstract only.

Ponce-Gonzalez et al., "High performance aliphatic-heterocyclic benzyl-quaternary ammonium radiation-grafted anion-exchange membranes," Energy and Environmental Science, vol. 9, No. 12, 2016, pp. 3724-3735.

Pribble et al., "Size-Specific Infrared Spectra of Benzene-(H2O)n Clusters (n = 1 through 7): Evidence for Noncyclic (H2O)n Structures," Science, vol. 265, No. 5168, Jul. 1994, pp. 75-79, abstract only.

Price et al., "Relationships between Structure and Alkaline Stability of Imidazolium Cations for Fuel Cell Membrane Applications," ACS Macro Letters, vol. 3, No. 2, 2014, pp. 160-165, abstract only.

Pryor et al., "Reactions of Radicals. Rates of Chain Transfer of Disulfides and Peroxides with the Polystyryl Radical," Journal of the American Chemical Society, vol. 84, No. 14, 1962, pp. 2705-2711, first page only.

Ramani et al., "Stabilized heteropolyacid/Nafion® composite membranes for elevated temperature/low relative humidity PEFC operation," Electrochimica Acta, vol. 50, No. 5, Jan. 2005, pp. 1181-1187, abstract only.

Rao et al., "Cardo poly(arylene ether sulfone) block copolymers with pendant imidazolium side chains as novel anion exchange membranes for direct methanol alkaline fuel cell," Polymer, vol. 54, No. 26, Dec. 2013, pp. 6918-6928, abstract only.

Refat et al., "Synthesis and spectroscopic characterization of piperidine/I2 charge-transfer complex in different chlorinated organic solvents," Bulgarian Chemical Communications, vol. 43, No. 3, 2010, pp. 439-448.

Robertson et al., "Tunable High Performance Cross-Linked Alkaline Anion Exchange Membranes for Fuel Cell Applications," Journal of the American Chemical Society, vol. 132, No. 10, 2010, pp. 3400-3404, abstract only.

Rocchiccioli-Deltcheff et al., "Vibrational investigations of polyoxometalates. 2. Evidence for anion-anion interactions in molybdenum(VI) and tungsten(VI) compounds related to the Keggin structure," Inorganic Chemistry, vol. 22, No. 2, 1983, pp. 207-216, abstract only.

Sarode et al., "Hydroxide Transport in Next Generation Anion Exchange Membranes," ECS Transactions, vol. 69, No. 17, 2015, pp. 363-367.

Seo et al., "Anion conductive poly(arylene ether sulfone)s containing tetra-quaternary ammonium hydroxide on fluorenyl group for alkaline fuel cell application," Electrochimica Acta, vol. 86, Dec. 2012, pp. 360-365, abstract only.

Shefer et al., "Free-radical telomerization of tert-butyl acrylate in the presence of bis(4-aminophenyl) disulfide as a useful route to amino-terminated telomers of poly(acrylic acid)," Macromolecules, vol. 26, No. 9, 1993, pp. 2240-2245, first page only.

Shi et al., "Synthesis and Proton Conductivity of Partially Sulfonated Poly([vinylidene difluoride-co-hexafluoropropylene]-b-styrene) Block Copolymers," Macromolecules, vol. 38, No. 10, 2005, pp. 4193-4201, abstract only.

Springer et al., "Polymer Electrolyte Fuel Cell Model," Journal of the Electrochemical Society, vol. 138, No. 8, Aug. 1991, pp. 2334-2342.

Stangar et al., "Silicotungstic acid/organically modified silane proton-conducting membranes," Journal of Solid State Electrochemistry, vol. 9, No. 2, Aug. 2004, pp. 106-113.

Starkweather Jr., et al., "Infrared spectra of amorphous and crystalline poly(tetrafluoroethylene)," Macromolecules, vol. 18, No. 9, 1985, pp. 1684-1686, abstract only.

Taguet et al., "Crosslinking of Vinylidene Fluoride-Containing Fluoropolymers," Crosslinking in Materials Science, 2005, vol. 184, pp. 127-211.

Taguet et al., "Grafting of 4-Hydroxybenzenesulfonic Acid onto Commercially Available Poly(VDF-co-HFP) Copolymers for the Preparation of Membranes," Fuel Cells, vol. 6, No. 5, Oct. 2006, pp. 331-339, abstract only.

Taguet et al., "Grafting of commercially available amines bearing aromatic rings onto poly(vinylidene-co-hexafluoropropene) copolymers," Journal of Polymer Science A, vol. 44, No. 6, Mar. 2006, pp. 1855-1868, abstract only.

Tanaka et al., "Anion Conductive Block Poly(arylene ether)s: Synthesis, Properties, and Application in Alkaline Fuel Cells," Journal of the American Chemical Society, vol. 133, No. 27, 2011, pp. 10646-10654, abstract only.

Tang et al., "Mechanical Properties of a Reinforced Composite Polymer Electrolyte Membrane and its Simulated Performance in PEM Fuel Cells," Journal of Power Sources, vol. 175, No. 2, 2008, pp. 817-825.

Tian et al., "A cleaner two-step synthesis of high purity diallyldimethylammonium chloride monomers for flocculant preparation," Journal of Environmental Sciences, vol. 17, No. 5, 2005. pp. 798-801.

Tobolsky et al., "The Reaction between Styrene and Ring Disulfides: Copolymerization Effected by the Chain Transfer Reaction," Journal of the American Chemical Society, vol. 75, No. 7, 1953, pp. 1757-1757.

(56) References Cited

OTHER PUBLICATIONS

Topchiev et al., "Some features of dimethyl diallyl ammonium chloride high conversion polymerization in aqueous solutions," European Polymer Journal, vol. 25, No. 11, 1989, pp. 1095-1098, abstract only.
Trogadas et al., "Degradation Mitigation in Polymer Electrolyte Membranes Using Cerium Oxide as a Regenerative Free-Radical Scavenger," Electrochemical and Solid-State Letters, vol. 11, No. 7, 2008, 8113-8116.
Tsai et al., "Thermally Cross-Linked Anion Exchange Membranes from Solvent Processable Isoprene Containing Ionomers," Macromolecules, vol. 48, No. 3, 2015, pp. 655-662.
Valade et al., "Preparation of solid alkaline fuel cell binders based on fluorinated poly(diallyldimethylammonium chloride)s [poly(DADMAC)] or poly(chlorotrifluoroethylene-co-DADMAC) copolymers," Journal of Polymer Science A, vol. 47, No. 8, Apr. 2009, pp. 2053-2058, abstract only.
Vandiver et al., "Effect of hydration on the mechanical properties and ion conduction in a polyethylene-b-poly(vinylbenzyl trimethylammonium) anion exchange membrane," Journal of Membrane Science, vol. 497, Jan. 2016, pp. 67-76, abstract only.
Vandiver et al., "Mechanical Characterization of Anion Exchange Membranes by Extensional Rheology under Controlled Hydration." Journal of the Electrochemical Society, vol. 161, No. 10, 2014, pp. H677-H683.
Vandiver et al., "Mechanical Performance of Polyisoprene Copolymer Anion Exchange Membranes by Varying Crosslinking Methods." Journal of the Electrochemical Society, vol. 162. No. 4, 2015, pp. H206-H212.
Varcoe et al., "Anion-exchange membranes in electrochemical energy systems," Energy and Environmental Science, vol. 7, No. 10, 2014, pp. 3135-3191.
Varcoe et al., "Poly(ethylene-co-tetrafluoroethyiene)-Derived Radiation-Grafted Anion-Exchange Membrane with Properties Specifically Tailored for Application in Metal-Cation-Free Alkaline Polymer Electrolyte Fuel Cells," Chemistry of Materials, vol. 19, No. 10, 2007, pp. 2686-2693, abstract only.
Varcoe et al., "Prospects for Alkaline Anion-Exchange Membranes in Low Temperature Fuel Cells," Fuel Cells, vol. 5, No. 2, Apr. 2005, pp. 187-200.
Wandrey et al., "Diallyldimethylammonium Chloride and its Polymers," Advances in Polymer Science, vol. 145, 1999, pp. 123-183, abstract only.
Wang et al., "Direct polymerization of sulfonated poly(arylene ether sulfone) random (statistical) copolymers: candidates for new proton exchange membranes," Journal of Membrane Science, vol. 197, No. 1-2, Mar. 2002, pp. 231-242, abstract only.
Webb, "A mild, inexpensive and practical oxidation of sulfides," Tetrahedron Letters, vol. 35, No. 21, May 1994, pp. 3457-3460, abstract only.
Xing et al., "Synthesis and characterization of sulfonated poly(ether ether ketone) for proton exchange membranes," Journal of Membrane Science, vol. 229, No. 1-2, Feb. 2004, pp. 95-106.

Xu et al., "Fluorene-containing poly(arylene ether sulfone)s as anion exchange membranes for alkaline fuel cells," Journal of Membrane Science, vol. 457, May 2014, pp. 29-38, abstract only.
Xu et al., "Novel anion exchange membrane based on copolymer of methyl methacrylate, vinylbenzyl chloride and ethyl acrylate for alkaline fuel cells," Journal of Membrane Science, vol. 354, No. 1-2, May 2010, pp. 206-211, abstract only.
Yadav et al., "Empirical Correlations to Predict In-situ Durability of Polymer Electrolyte Membranes in Fuel Cells," ECS Transactions, vol. 53, No. 30, 2013, pp. 187-199, abstract only.
Yang et al., "1,2-Dimethylimidazolium-functionalized cross-linked alkaline anion exchange membranes for alkaline direct methanol fuel cells," international Journal of Hydrogen Energy, vol. 40, No. 5, Feb. 2015, pp. 2363-2370, abstract only.
Yang et al., "Poly(2,6-dimethyl-1,4-phenylene oxide)-b-poly(vinylbenzyltrimethyfammonium) Diblock Copolymers for Highly Conductive Anion Exchange Membranes," Macromolecules, vol. 48, No. 13, 2015, pp. 4471-4480, abstract only.
Zaton et al., "Current understanding of chemical degradation mechanisms of perfluorosulfonic acid membranes and their mitigation strategies: a review," Sustainable Energy Fuels, vol. 1, No. 3, 2017, pp. 409-438.
Zhang et al., "A New Alkali-Stable Phosphonium Cation Based on Fundamental Understanding of Degradation Mechanisms," ChemSusChem, vol. 9, No. 17, Sep. 2016, pp. 2374-2379, abstract only.
Zhang et al., "Achieving Continuous Anion Transport Domains Using Block Copolymers Containing Phosphonium Cations," Macromolecules, vol. 49, No. 13, Jun. 22, 2016, pp. 4714-4722.
Zhang et al., "Anion-Exchange Membranes for Fuel Cells: Synthesis Strategies, Properties and Perspectives," Fuel Cells, vol. 15, No. 6, Dec. 2015, pp. 761-780, abstract only.
Zhang et al., "Tertiary sulfonium as a cationic functional group for hydroxide exchange membranes," RSC Advances, vol. 2, No. 33, 2012, pp. 12683-12685, abstract only.
Zhang, "Synthesis and Characterization of Polymeric Anion Exchange Membranes," University of Massachusetts Amherst Doctoral Dissertation. May 2016, 311 pages.
Official Action for U.S. Appl. No. 16/109,618, dated Feb. 24, 2020, 8 pages. Restriction Requirement.
Official Action for U.S. Appl. No. 16/109,618, dated Oct. 20, 2020, 8 pages.
Official Action for U.S. Appl. No. 16/109,618, dated May 1, 2020, 9 pages.
Official Action for U.S. Appl. No. 16/113,774, dated Mar. 9, 2020, 8 pages. Restriction Requirement.
Official Action for U.S. Appl. No. 16/113,774, dated May 1, 2020, 8 pages.
Notice of Allowance for U.S. Appl. No. 16/113,774 dated Aug. 12, 2020, 8 pages.
Official Action for U.S. Appl. No. 16/150,113, dated Feb. 27, 2020, 8 pages.
Notice of Allowance for U.S. Appl. No. 16/150,113, dated Jun. 19, 2020, 8 pages.

* cited by examiner

434 + 23 (Na) = 457

HIGH PERFORMANCE CROSS-LINKED TRIBLOCK CATIONIC FUNCTIONALIZED POLYMER FOR ELECTROCHEMICAL APPLICATIONS, METHODS OF MAKING AND METHODS OF USING

CROSS REFERENCE TO RELATED APPLICATIONS

This application is a continuation of U.S. patent application Ser. No. 16/150,113, filed on Oct. 2, 2018, which claims priority and the benefit under 35 U.S.C. § 119(e) to U.S. Provisional Application Ser. No. 62/567,038, filed on Oct. 2, 2017. Each of these references are incorporated by reference in their entirety.

GOVERNMENT LICENSE RIGHTS

This invention was made with government support under grants MURI # W911NF-10-1-0520 and W911NF-12-R-0012-04, awarded by The United States Army. The government has certain rights in the invention.

FIELD OF THE INVENTION

The present invention relates to a high performance cross-linked triblock cationic functionalized polymer for electrochemical applications, and methods of making and using the same. In particular, the present invention relates to modifications to the ABA polychloromethylstyrene-co-poly-cycloctadiene-co polychloromethylstyrene, PCMS-pCOE-pCMS. The material of the present invention provides unexpected superior qualities to the base material. An aspect of the invention relates to a tunable hydrogenated polymer, that can be functionalized with a particular cation for a particular application, and the method of making the hydrogenated polymer and tuning the hydrogenated polymer for the application.

BACKGROUND

A-B-A triblock polymers are used to produce a variety of chemical products. Chemical, photo, and heat crosslinking are essential chemical processes that are used to form functionalized polymers with a range of applications. These applications include anion exchange membranes (AEMs), which are generally semipermeable membranes that are impermeable to gases, while conducting anions.

A base polymer system without advance cations or any crosslinking was discussed in a University of Massachusetts PhD thesis of Wenxu Zhang, which was published in 2016, "Synthesis and characterization of polymeric anion exchange membranes", which is incorporated by reference in its entirety. However, the material produced in this thesis does not include crosslinks and/or hydrogenation. Without crosslinks and/or hydrogenation, the material cannot be used in many applications because the mid-block melts at 50° C. and the material swells uncontrollably. Accordingly, there has been a long-felt but unmet need to produce a functionalized polymer with improved melt temperature, mechanical strength, and resistance to swelling.

SUMMARY

AEMs with alkaline conductivity greater than 100 mS/cm, which are mechanically strong and chemically stable in basic conditions are important for practical devices such as fuel cells, electrolyzers, redox flow batteries, and for water purification. Previously, neither highly conductive nor mechanically strong anion exchange membranes could be fabricated, but a single membrane with both high conductivity, chemical stability, and mechanical strength is highly desired to overcome serious bottle necks in membrane science. The present invention is a triblock polymer functionalized with a highly chemically stable cation and a method of producing AEMs that are strong, conductive, and chemically and mechanically stable. In some embodiments, the membranes can be fabricated as thin as about 10 microns for energy producing devices or as a thick as 100 microns for electrolysis or water purification devices.

The present invention relates to a method of cross-linking a highly processable, symmetric A-B-A tri-block membrane, which can be used as an AEM. "A" are hydrophilic blocks and "B" is a hydrophobic block. An aspect of the invention is the use of one or a combination of two or three cross-linkers:

1) dithiols or other common cross-linkers that react with unsaturated bonds to cross-link the hydrophobic block of the polymer;

2) heat treatment of the base A-B-A chlorinated triblock polymer to partially eliminate chloride to leave sites that then form cross-linked covalent bonds; or 3) di-functionalized methylene chains (2, 4, or 6 carbons) functionalized with C5 or C6 cyclic saturated ammonium cations which cross-link the hydrophilic part.

Cross-linking the B midblock results in a material with unexpected superior qualities to the base material. The methods of the invention drastically improve the mechanical stability of the membranes so that the membranes become practical and still give unexpectedly high ionic conductivity. The use of the C6 cyclic saturated N-methylpiperidine (MPRD) cation in this system with dithiol cross-linkers improve both mechanical and chemical stability. Changing methyl to hexyl on the N-piperidine cation can provide additional chemical stability to the polymer.

Membranes of the present invention result in higher ion exchange capacity than previously reported via a modified method using methylenedichloride and a longer soaking time that gives films cross-linked with hydroxide conductivities as high as about 140 mS cm$^{-1}$ at about 80° C. and about 95% relative humidity (RH). The thickness of the membranes can also be tightly controlled which is highly desired for AEMs used in electrochemical applications. The use of this dithiol (DT) crosslinker enables the membranes to be as thin as about 10 microns and still be stand-alone for fabrication into membrane electrode assemblies. The demonstrated innovation of the use of the DT crosslinker along with the MPRD cation in poly(cyclooctene) based triblock AEMs is a significant step towards commercializing the polymer in membrane-based devices. An about 100 micron thin film can be used in an electrolyzer to enable the electrochemical production of ammonia from nitrogen in the air with record efficiency and current density.

The A block can be a functionalized poly(benzylammonium cation) and the B block can be a poly(cyclo-octene) or poly(cycloctadiene). When crosslinked and functionalized with a C5 or C6 cyclic saturated ammonium cation in such a way to give a high ion exchange capacity material, the membranes give exceptional conductivity and mechanical strength in a single membrane. These membranes are suitable for incorporation in devices such as fuel cells, electrolyzers and redox flow batteries without crosslinking. Because the middle block melts at a temperature of about 55° C., it cannot be used above 60° C. without cross-linking.

With crosslinking of the B polymer, the membrane can be used at temperatures up to about 180° C., in some embodiments between about 160° C. and about 200° C. Furthermore, without cross-linking, the material swells uncontrollably and also becomes impractical for all applications.

Electrochemistry in basic conditions is more facile than in acid. A practical AEM provides less expensive non-precious metal catalysts and can allow for oxidization or synthesis of more complex fuels involving carbon-carbon bonds. Furthermore, there is still not a commercial AEM that is both highly conductive to hydroxyl or chloride anions and mechanically strong when wet. The present invention describes an AEM that is both highly conductive and stable to hydroxyl anions and mechanically strong when wet. The materials used for fabrication of the membranes and materials of the present invention are less expensive and enable a more versatile fuel cells, electrolyzers, redox flow batteries, membranes for electrochemical water applications, sensors, and electrochemical reactors, as well as other applications.

An aspect of the invention is a modification to the A-B-A triblock polymer (e.g. polychloromethylstyrene-co-polycycloctadiene-co polychloromethylstyrene, or PCMS-pCOE-pCMS). The invention includes:

a. Hydrogenation of the mid poly-cyclooctadiene B hydrophobic block to give a polyethylene mid-block.
b. Cross-linking of the mid poly-cyclooctadiene B hydrophobic block. Crosslinking can be performed in the presence of dithiols as illustrated in several examples of the invention. However, any method that works with olefins can be utilized to crosslink the mid poly-cyclooctadiene B hydrophobic block, including radiation, generation of radicals with azobisisobutyronitrile (AIBN) and heat or UV light, or crosslinking with diphenol and base, for example.
c. Cross-linking of the outer A blocks either by heating the material to an elevated temperature in order to lose chlorine or hydrogen chloride to form a cross-link, or by quaternization with a dibase such as 1,3-di-4-piperidylpropane followed by quaternization with methyl iodide.
d. Quaternization of the above materials to produce AEMs with trimethyl amine, methyl piperidinium, hexyl piperidinium, methyl or hexyl pyrrolidinium, or modification of the benzylic carbon with a long spacer chain, typically 6 methylene units and quaternization, which eliminates the benzylic position which is known to be a weak link.

Any individual step of a, b, or c, or a combination of two or more of steps a, b or c, followed by quaternization give an AEM of completely tunable properties and ion exchange capacity (IECs) from about 1 to about 4 meq g-1. Notably, the mid poly-cyclooctadiene B hydrophobic block is a novel material that cannot be made easily directly from ethylene. Thus, this precursor material is an aspect of the invention.

An aspect of the invention is a method of forming a membrane comprising a triblock cationic functionalized polymer. The method includes providing a first polymer, where the first polymer is a triblock polymer and includes a hydrophobic polymer and two hydrophilic polymers. The first polymer is mixed with a second material, which is a cation, to form a first mixture. The hydrophobic polymer of the triblock polymer of the first mixture is crosslinked to form the triblock cationic functionalized polymer in a solution. The triblock cationic functionalized polymer in the solution is cast onto a substrate and the solvent is evaporated to produce a membrane.

An aspect of the invention is a method of cross-linking a mid-block of a triblock polymer. The method includes selecting a triblock polymer, where a structure of the polymer consists of A-B-A. Unit A is hydrophilic and is selected from the group consisting of a halogenated polyvinyl benzyl and a halogenated polymethyl styrene, and unit B is hydrophobic and selected from the group consisting of a polyisoprene, a polycycloctene, a polycyclooacdiene, and a polycyclooctatriene. The triblock polymer, a photoinitiator and a alkyldithiol are dissolved in a solvent to form a solution, which is added to a substrate. The solvent is evaporated to make a film on the substrate. At least one double bond of the unit B of the triblock polymer is crosslinked by applying UV radiation to produce a crosslinked triblock A-B-A polymer.

An aspect of the invention is a triblock cationic functionalized polymer. The polymer includes a hydrophobic polymer that is crosslinked, two hydrophilic polymers, and a cation.

An aspect of the invention is a method of preparing a triblock cationic functionalized polymer. The method includes dissolving a first polymer in a solvent. The first polymer comprises a triblock polymer comprising a hydrophobic polymer and two hydrophilic polymers. The first polymer is mixed in the solvent to produce a hydrogenated triblock polymer. The solvent is evaporated and the hydrogenated triblock polymer is subjected to a cation. The hydrophobic polymer is crosslinked.

DETAILED DESCRIPTION

Figure 1A:
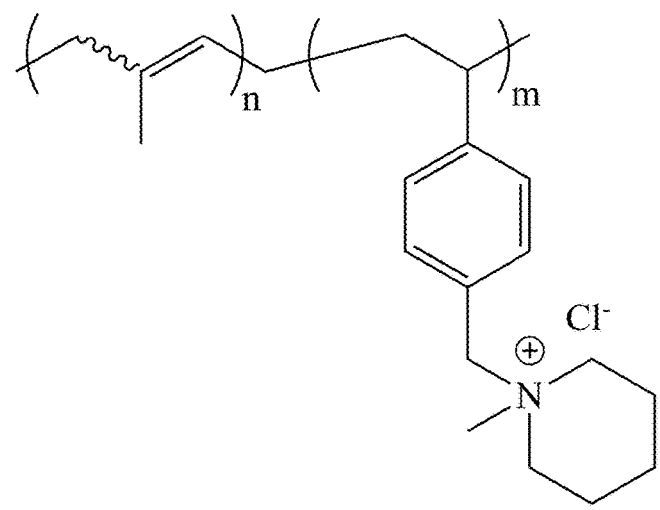
FIG. 1A illustrates a polyisoprene-r-polyvinylbenzyl chloride based random polymer.

The present invention has been described with some degree of particularity directed to exemplary embodiments of the present invention. It should be appreciated though that modifications or changes may be made to the exemplary embodiments of the present invention without departing from the inventive concepts contained herein.

Aspects of the present invention is directed to a method of producing a triblock cationic functionalized polymer, the triblock cationic functionalized polymer, methods of using the triblock cationic functionalized polymer, a hydrogenated precursor polymer, method of tuning the triblock polymer for particular applications, and other inventions would also be apparent to one skilled in the art.

An aspect of the invention is a method to produce a triblock cationic functionalized polymer. The triblock cationic functionalized polymer includes a first polymer that is mixed with a second material to create a first mixture. The hydrophobic polymer of the triblock cationic polymer is crosslinked to form the triblock cationic functionalized polymer.

In various embodiments of the present inventions, the first polymer is a triblock polymer, such as an A-B-A triblock polymer. The A-B-A triblock polymer can be in the form of a powder, or a liquid. The A groups of the triblock polymer are hydrophilic, while the B group is hydrophobic. Suitable A groups include polyvinyl benzyl chloride, polycholorostyrene or combinations thereof. In some embodiments, the A groups can be the same, forming a symmetric triblock polymer, while in some embodiments, the A group can both by hydrophilic, but comprise of different groups. The B group can include polycyclooctene, polycyclooctadiene, polyisoprene (PIp) or polycyclooctatriene. Prior to mixing the first polymer with the second material, the first polymer can be dissolved in a solvent. The solvent can be dichloromethane, chloroform, or combinations thereof. The first polymer dissolved in the solvent can then be added to the second material to form the first mixture.

The second material comprises a cation species. The cation species can include benzyl methylpiperidinum (MPRD), trimethylbenzyl ammonium, tris(2,4,6-trimethoxyphenyl) phosphonium (TTMPP), dimethylpiperidinium, dimethylpyrrolidinium, quaternize chlorinated polymers (e.g. benzyl trimethyl ammonium (BTMA), benzyl TTMPP, MPRD, and benzyl methyl pyrrolidinium (MPY)), and combinations thereof. The ratio of the first polymer to the second material can be between about 1:20 and about 1:30. In some embodiments, the second material can be purged with an inert gas, such as nitrogen, argon, helium, or combinations thereof, prior to mixing. After the first polymer and the second material are combined, they can be mixed for greater than about 0 minutes and less than or equal to about 72 hours, at a temperature of between about 35° C. and about 45° C. The mixture can be combined by any suitable method, for example stirring, shaking, agitating, or other similar methods. The reaction can occur in the inert environment, or the mixture can be purged with an inert gas and sealed following mixture. In some embodiments, the mixture can occur in a dark environment (i.e. without visible or ultraviolet light). The mixture can be maintained at an inert environment for greater than about 0 minutes and less than or equal to about 90 hours, in some embodiments about 72 hours, to form a gel. The gel can be precipitated with an alcohol. The alcohol can be methanol, isopropanol, ethanol, or combinations thereof. The precipitate can then be washed with an alcohol and/or a water (deionized, distilled, or tap, or combinations thereof). The alcohol can be methanol, isopropanol, ethanol, or combinations thereof. In some embodiments, the precipitate can be dried at temperature between about 25° C. and about 50° C., in some embodiments between about 30° C. and about 40° C., for greater than about 0 minutes and less than or equal to about 24 hours, in some embodiments about 12 hours. In some embodiments, the drying can also occur under vacuum at a pressure between about 10 psi and about 40 psi, in some embodiments between about 20 psi and about 25 psi. The yield of the product can be between about 80% and about 95%. The precipitate is in the form A-B-A-cation. The precipitate is an aspect of the invention.

In some embodiments, the precipitate can be used to form a membrane. The membrane can be formed by solvent drop casting the precipitate into a solution. The solution can include chloroform, and combinations thereof. In some embodiments, the ratio of the precipitate to the solution can be between about 1:20 and about 1:30. The precipitate can be allowed to dissolve in the solution for between about 240 minutes and about 2 days, in some embodiments about 3 days. The solution can be maintained at a temperature between about 30° C. and about 45° C., in some embodiments about 45° C.

The B polymer of the precipitate can be crosslinked prior to forming a membrane or after forming of the membrane using any suitable method, including crosslinking with dithiols, treatment with radiation, generation of radicals with AIBN with the addition of heat or UV light, crosslinking with diphenol and a base, or combinations thereof. In some embodiments, a photo initiator can be used to crosslink the B polymer. The photo initiator can be added to the polymer solution at a ratio of the photo initiator to the polymer solution (based on the amount of the B polymer in the triblock polymer) of between about 1:0.05 and about 1:0.03. The reaction mixture can be stirred at a temperature between about 20° C. and about 40° C., in some embodiments about room temperature (i.e. about 22-27° C.) for between about 2 minutes and about 10 minutes, in some embodiments between about 5 minutes and about 10 minutes, in some embodiments about 4 minutes. The reaction mixture can be stirred in a dark environment. The mixed solution can be drop cast onto a polytetrafluoroethylene (e.g. Teflon™) substrate, or a substrate comprising a releasing film or material. An upper boarder material can be used to apply a pressure to the mixture to form the film. The upper boarder material can also be used to regulate the thickness of the resulting film. It can also decelerate the evaporation of the solvent. The solvent in the mixed solution can evaporate at a temperature of between about 20° C. and about 40° C., in some embodiments between about 22° C. and about 27° C., in some embodiments about room temperature, for greater than about 0 minutes and less than or equal to about 24 hours, in some embodiments about 12 hours. In some embodiments, the resulting film can be subjected to between about 1 and about 10 (in some embodiments between about 2 and 5) additional curing steps over the parameters discussed above. The film can be exposed to an appropriate light source (e.g. UV light, visible light, etc.) to crosslink the "B" polymer component of the film. The membranes can be removed from the substrate to form a free-standing substrate. In some embodiments, the membrane can then be washed by soaking or rinsing the membrane in water (deionized, distilled, tap or combinations thereof) and/or a solvent (e.g. an amine solution such as trimethylamine (TMA), or other solvents such as methylpiperidinum (MPRD)) for greater than about 0 minutes and less than or equal to about 72 hours, at a temperature between about 20° C. and about 50° C., in some embodiments between about 35° C. and about 45° C. The thickness of the films can be between about 10 microns and about 80 microns, in some embodiments between about 40 microns and about 50 microns. The films can be uniform in thickness, varying by less than about 10% at various positions of the film.

In some embodiments, the hydrophilic portion of the triblock polymer can also be crosslinked. For example, cross-linking of the "A" polymer can occur by heat treatment or the use of a crosslinking material of the first mixture. Heat treatment of the first mixture, which can be a halogenated triblock polymer (for example chlorine), can at least partially if not fully eliminate halogen to leave sites that then form cross-linked covalent bonds. It will be appreciated that linking by heat treatment can be used in combination with other crosslinking methods, including linking with a component such as DT. Dibases can also be utilized to crosslink the "A" block. Crosslinking of the "A" polymer can reduce or prevent swelling of the "A" block. Swelling of the "A" block can create mechanical decomposition. Heat treatment or using the diamine can solve this issue. In some embodiments, the crosslinking material can include a diamine. In some embodiments, the "A" polymer can be crosslinked before the B polymer is cross linked.

An aspect of the present invention is a tunable hydrogenated triblock polymer and a method of forming the hydrogenated triblock polymer. The hydrogenated triblock polymer can be tuned based on the final product. In addition to the method described above, which provided embodiments of tri-block crosslinked polymers, other methods can be used that related to a precursor of a hydrogenated-triblock polymer using a hydrogen itself can be used or any common method of hydrogenation. In some embodiments, a diimide derived from the thermal decomposition of p-toluenesulfonyl hydrazide (TSH) can be used in the hydrogenation process. The hydrogenated triblock polymer is a linear poly(octane) with the same molecular weight distribution compared to products made with other methods described for the invention.

For example, in some embodiments, the first polymer can be dissolved in a hydrocarbon, for example ρ-xylene, and the like. The first polymer in the hydrocarbon can be at a temperature between about 20° C. and about 160° C., in some embodiments between about 120° C. and about 140° C., in some embodiments about room temperature. The mixture can be maintained at a temperature between about 120° C. and about 140° C., in some embodiments about 125° C., which can be mixed at this temperature, for greater than about 0 minutes and less than or equal to about 3 hours, in some embodiments, about 2.5 hours. In some embodiments, an oil bath can be used to maintain the mixture at temperature during mixing. The hot mixture can be added slowly (i.e. at a rate between about 10 mL/minute and about 20 mL/min) to an alcohol. The alcohol can be methanol, or the like, to form a precipitate. The remaining solvent can be removed by filtration, evaporation, drying, etc. If hydrazide has been used in the hydrogenation process, then hydrazide can be removed by suspending the polymer powder in boiling water (between about 90° C. and about 95° C.). The fluids can again be removed by filtration, evaporation, drying, etc. The polymer can be dried at a temperature between about 20° C. and about 50° C., in some embodiments between about 25° C. and about 35° C., in some embodiments about 35° C., for greater than about 0 minutes and less than or equal to about 24 hours, in some embodiments about 12 hours. Drying can occur in a vacuum at a pressure between about 20 psi and about 25 psi. The yield of the product can be between about 97% and about 99.5%. The product is a hydrogenated polymer, which is an aspect of the invention. The hydrogenated polymer can be of the form Ax-By-Ax, for example $(PCMS)_{162.4}$-$(PE)_{653}$-$(PCMS)_{162.4}$, or $(PCMS)_{164.2}$-(polymethyl butylene)$_{653}$-$(PCMS)_{164.2}$.

The hydrogenated polymer can be used in various subsequent methods to yield various products. To produce a hydrogenated-triblock polymer quaternization with MPRD, the hydrogenated polymer can be suspended in a hydrocarbon solution, for example xylene. The polymer solution can be cast on a substrate, which can be coated to facilitate release or made of the release material (e.g. polytetrafluoroethylene). The solvent in the polymer solution can be evaporated at a temperature between about 25° C. and about 35° C., for between about 20 minutes and about 2 hours. The polymer can be hot pressed at a temperature between about 130° C. and about 180° C. to form a hydrogenated triblock polymer membrane.

The hydrogenated triblock polymer membrane can be treated by subjecting the membrane to a solution comprising the cation. The cation can be MPRD, trimethylamine solution (TMA), HPRD. The cation can be in a methanol solution (comprising between about 25 wt. % and about 50 wt. % of the cation) at a temperature between about 30° C. and about 40° C., in some embodiments about 35° C., for greater than about 0 minutes and less than about 4 days, in some embodiments about 4 days. The quaternized polymer can be washed or rinsed with water (distilled, deionized, tap, or combinations thereof). The quaternized polymer can be annealed in water (deionized, distilled, tap or combinations thereof) for between about in some embodiments between about 15° C. and about 90° C., in some embodiments between about 25° C. and about 80° C., in some embodiments about 80° C., for great than about 0 minutes and less than or equal to about 36 hours, in some embodiments about 24 hours.

In an aspect of the invention, the hydrogenated polymer can be dissolved in chloroform rather than a hydrocarbon solution. The hydrogenated polymer can be dissolved in the chloroform for greater than about 0 minutes and less than or equal to about 24 hours, in some embodiments about 3 hours, at a temperature between about 25° C. and about 80° C., in some embodiments between about 50° C. and about 60° C., in some embodiments about 35° C. The polymer solution can be cast on a substrate, which can be coated to facilitate release or made of the release material (e.g. polytetrafluoroethylene). The solvent in the polymer solution can be evaporated at a temperature between about 40° C. and about 50° C., for greater than about 0 minutes and less than or equal to about 24 hours. The polymer can be hot pressed at a temperature between about 130° C. and about 180° C. The hydrogenated triblock polymer membrane (or triblock/ 1, 10-decanedithiol (DT) membrane) can be treated by subjecting the membrane to a solution comprising the cation. The cation can be trimethylenedipiperidine (DPRPP). The cation can be in a methanol solution (comprising between about 0.1M and about 0.9M, in some embodiments about 0.25 M and about 0.5 M of the cation, in some embodiments about 0.25M) at a temperature between about 45° C. and about 60° C., in some embodiments about 50° C., for greater than about 0 minutes and less than or equal to about 3 days, in some embodiments about 20 hours. The quaternized polymer can be rinsed with a solvent (e.g. methanol, or the like) and/or water (distilled, deionized, tap, or combinations thereof). The quaternized polymer can be annealed in water (deionized, distilled, tap or combinations thereof) for between about 75° C. and about 80° C. In some embodiments, the membrane can be dried over snorkel (i.e. by flowing air over the polymer). The duration of the drying can be greater than about 0 minutes and less than or equal to about 24 hours, in some embodiments about 12 hours. The membranes can be quaternized with a halogenated hydrocarbon, such as iodomethane, which can be present in an alcohol, such as methanol. The concentration of the halogenated hydrocarbon can be between about 1 M and about 2M, in some embodiments about 2 M. The membranes can be subjected to the halogenated hydrocarbon at a temperature between about 25° C. and about 50° C., in some embodiments between about 30° C. and about 35° C., in some embodiments about 37° C., for greater than about 0 minutes and less than or equal to 60 hours, in some embodiments between about 1 hour and about 48 hours, in some embodiments about 48 hours. The quaternized membranes can then washed or rinsed with an alcohol, such as methanol. The membranes can be treated with a salt solution, for example a LiCl in methanol solution, where the concentration can be between about 1 M and about 2 M of the salt. The membranes can be treated with the salt solution at a temperature between about 45° C. and about 55° C., for greater than about 0 minutes and less than or equal to about 48 hours, in some embodiments about 40 hours. The salt solution can alter the counter-ion on the membrane. For example, if the initial counter-ion was iodine based on the halogenated carbon, the new counter-ion can be chlorine if the salt solution is LiCl. The membranes can be washed or rinsed with an alcohol, for example methanol, or water (deionized, distilled, tap, or combinations thereof) or a combination of the alcohol and water. The washing can occur for greater than about 0 minutes and less than or equal to about 10 hours, in some embodiments between about 30 minutes and about 1 hour, in some embodiments for about 1 hour, at a temperature between about 25° C. and about 30° C. The membrane can be dried over snorkel for between about 24 hours and about 48 hours at a temperature between about 25° C. and about 30° C.

As aspect of the invention is a method to quaternize a triblock polymer with 1-hexylpiperidine, (HPRD). HPRD can be prepared by synthetization by alkylation of piperidine and 1-hexanol with catalyst iridium (N-heterocyclic carbene). The HPRD can be in an alcohol, such as methanol, where the concentration of the HPRD in the alcohol can be between about 2 M and about 4 M. The HPRD in alcohol can be purged with an inert gas (which can be ultra-high purity), for example nitrogen, argon, helium, or combinations thereof, for between about 5 minutes and about 24 hours, in some embodiments between about 15 minutes and about 1 hour, in some embodiments about 15 min.

The hydrogenated triblock copolymer $(PCMS)_{162.4}$-$(PE)_{653}$-$(PCMS)_{162.4}$ can be dissolved in dichloromethane (DCM), chloroform, dichloroethane, and the like or combinations thereof where the concentration of the hydrogenated polymer in the solvent can be between about 1 M and about 2 M. HPRD can be combined with the hydrogenated polymer in the solvent at a ratio of between about 1:10 and about 1:20 to form a mixture. The mixture can be mixed to dissolve the polymer in the solvent at a temperature between about 30° C. and about 40° C., in some embodiments about room temperature. The mixture can be purged with an inert gas (e.g. nitrogen, helium, argon, and combinations thereof) and sealed for greater than about 0 minutes and less than or equal to about 72 hours. An active purge during this time is not necessary, but the mixture can be stirred over the duration of time. The gel can be precipitated in MeOH, washed with MeOH, and then dried in the oven at 30° C. under vacuum overnight. The product can be in the form of Ax-By-Ax-HRRD, for example $((PCMS)_{162.4}$-$(PCOE)_{653}$-$(PCMS)_{162.4}$/HRRD). The percent yield of the product can be between about 70% and about 80%.

An aspect of the invention is a functionalized cation triblock polymer. In some embodiments of the present disclosure, the A-B-A triblock polymer includes polychloromethylstyrene-co-polycycloctadiene-co polychloromethylstyrene—cation, PCMS-pCOE-pCMS-cation, $(PCMS)_{164.2}$-(polymethyl butylene)$_{653}$-$(PCMS)_{164.2}$-cation, or $(PCMS)_{164.2}$-$(PE)_{653}$-$(PCMS)_{164.2}$-cation. The B polymer of the triblock polymer is crosslinked, while the A polymers can be crosslinked, but it is not required. This polymer has advantageous properties compared to other polymers. For example, the polymer is one of the most highly anionically conducting polymers known by the inventors. For example, the conductivity of the cationic functionalized polymer is at least about 0.4 S/cm, in some embodiments between about 0.001 S/cm to about 0.15 S/cm. In other embodiments, the conductivity can be between about 0.015 S/cm to about 0.1 S/cm. The conductivity can continually increase between about 15° C. to about 100° C. In other embodiments, the conductivity continually increases between about 30° C. to about 80° C. In some embodiments, the increase can be low, for example where the activation energy (as plotted on an Arrhenius plot) can be between about 0.1 kJ/mol and about 15 kJ/mol, in some embodiments about 10 kJ/mol for protons such as sulfonated tetrafluoroethylene based fluoropolymer-copolymer (e.g. Nafion®). In comparison, polymers that are not crosslinked or prior art polymer have a conductivity between about 0.08 S/cm and about 0/12 S/cm. The polymers of the present invention can be used to form membranes. Membranes made of the polymer also exhibit exceptional properties. Membranes, for example AEMs, can have tunable properties and IECs from 1 to 4 meq g-1. In some embodiments the tensile strength of the membranes comprising the polymer can be between about 100 MPa and about 150 MPa, when dry and between about 10 MPa and 20 MPa when wet.

An aspect of the invention is a hydrogenated triblock polymer. The hydrogenated triblock polymer can be tuned for a particular application. Suitable polymers made from the hydrogenated triblock polymer include PCMS-b-PMB, or PCMS-b-PCMS, where "b" can be polymethyl butylene, or polyethylene, for example.

When the "b" polymer, either hydrogenated or functionalized, is polymethyl butylene, the polymer may not be crystalline, as it can be when the polymer is polyethylene for example. As a result, when polymethyl butylene is the "b" polymer, it allows properties of the overall polymer to be further tuned.

Figure 7A:
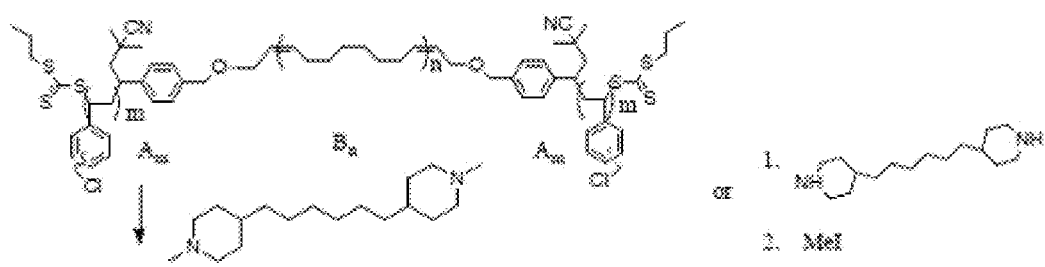
FIG. 7A illustrates the reactants of a method to cross-link the A polymer of a triblock polymer with cross-linking materials in accordance with the present invention.
Figure 7B:
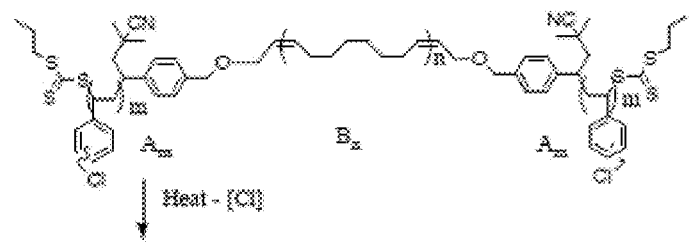
FIG. 7B illustrates the reactants of a method to cross-link the A polymer of a triblock polymer with heat in accordance with the present invention.
Figure 7C:
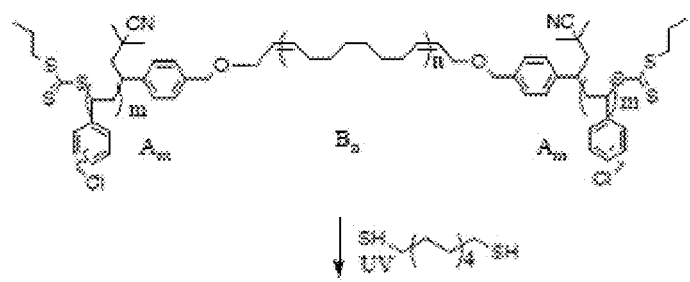
FIG. 7C illustrates the reactants of a method to cross-link the B polymer of a triblock polymer with a cross-linking material in accordance with the present invention.

FIGS. 7A-C illustrate the reactants of methods to cross-link the triblock polymer of the present invention. The products are cross-linked, but the products are not illustrated in these figures.

Figure 8:
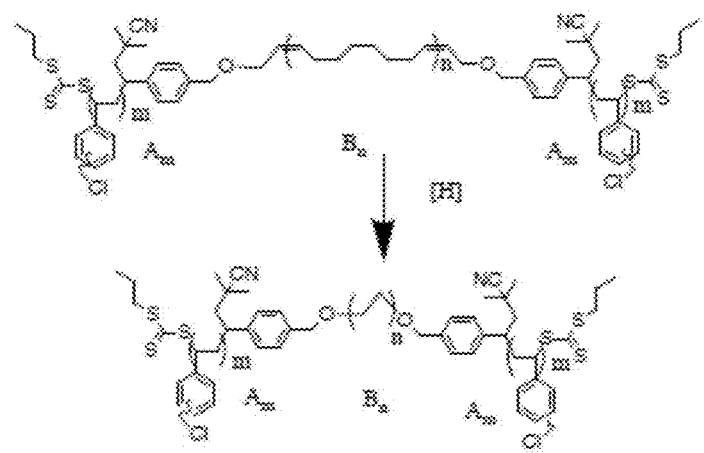
FIG. 8 illustrates a method to hydrogenate a triblock polymer of the present invention.
Figure 9:
FIG. 9 illustrates an A block polymer for use in embodiments of the present invention.
Figure 10:
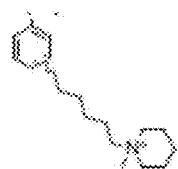
FIG. 10 illustrates an A block polymer for use in embodiments of the present invention.
Figure 11:
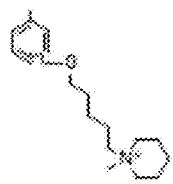
FIG. 11 illustrates an A block polymer for use in embodiments of the present invention.

FIG. 8 illustrates a method to hydrogenate the B polymer of the triblock polymer. The method begins with a starting triblock polymer. Hydrogen [H] is provided to the reaction at an appropriate temperature and for an appropriate duration as discussed above. The resulting polymer is hydrogenated as illustrated in the B block of the polymer. FIGS. 9, 10 and 11 illustrate alternative "A" polymers that can be used with any aspect of the present invention.

An aspect of the invention is the Pip-PCMS synthesis. Homopolymerization of isoprene (Ip) can occur with pyridine or other suitable materials at a temperature between about 90° C. and about 125° C., in some embodiments about 115° C. via nitroxide-mediated polymerization (NMP).

Figure 23:
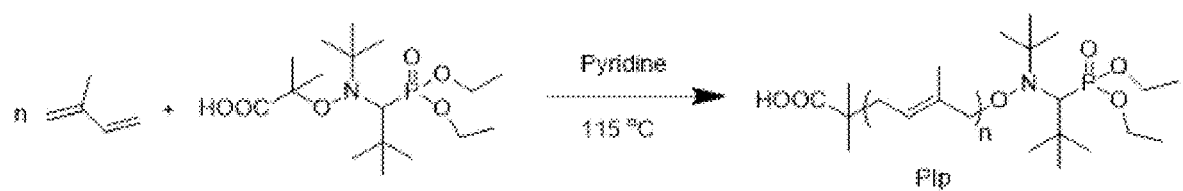
FIG. 23 illustrates the homopolymerization of isopropylene.
Figure 24:
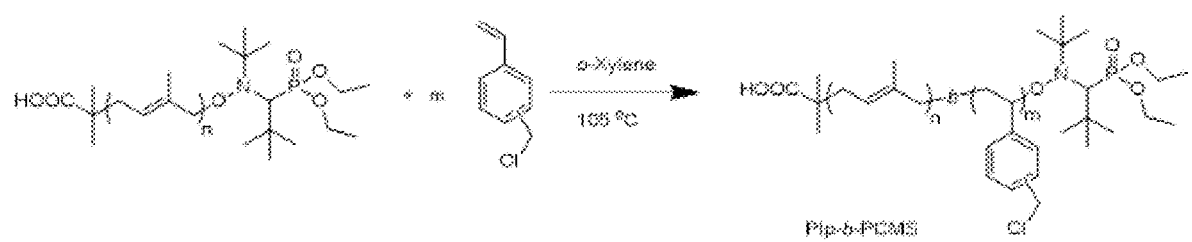
FIG. 24 illustrates the chain extension by CMS.
Figure 25:
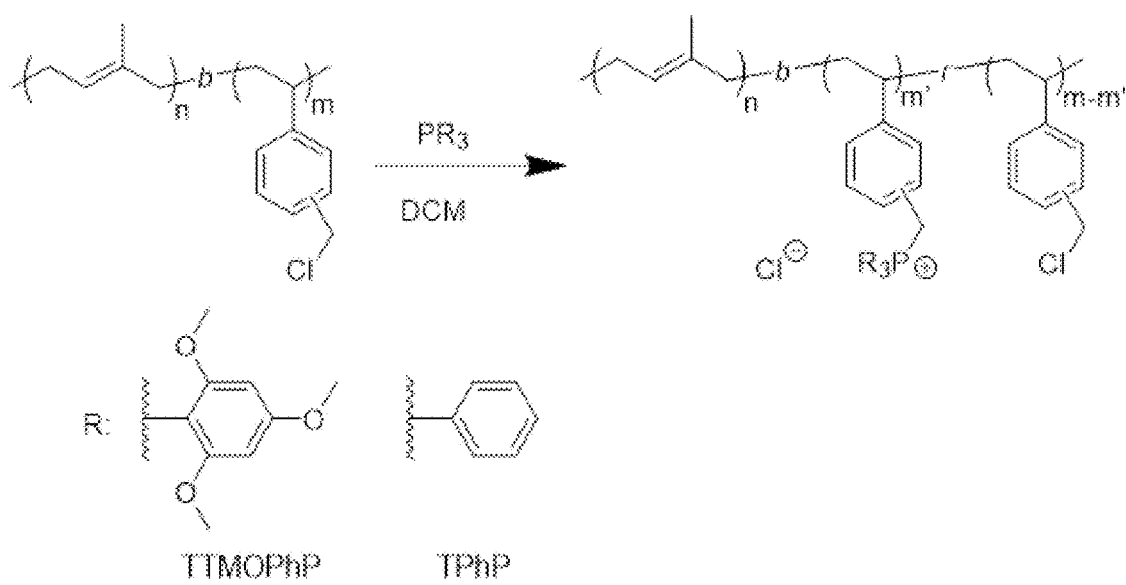
FIG. 25 illustrates the quaternization by TTMOPhP or TPhP.
Figure 26A:
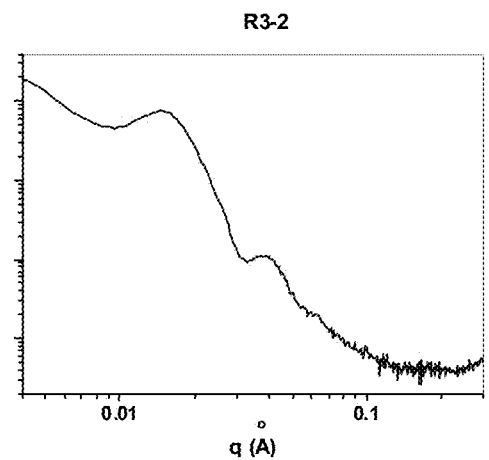
FIG. 26A illustrates a SAXS graph for R3-2.
Figure 26B:
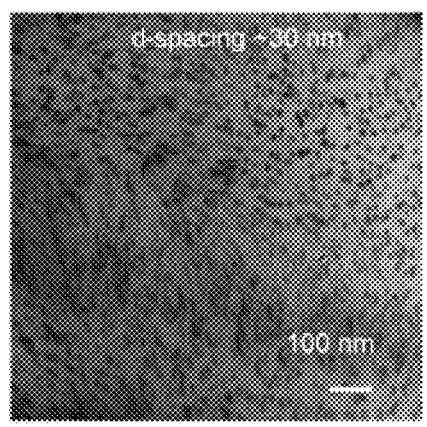
FIG. 26B illustrates a TEM graph for R3-2.
Figure 27A:
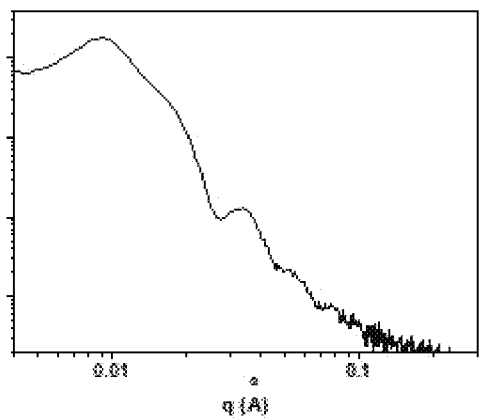
FIG. 27A illustrates a SAXS graph for R3-3.
Figure 27B:
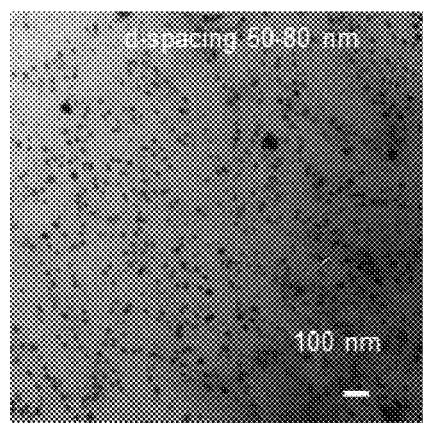
FIG. 27B illustrates a TEM graph for R3-3.
Figure 28A:
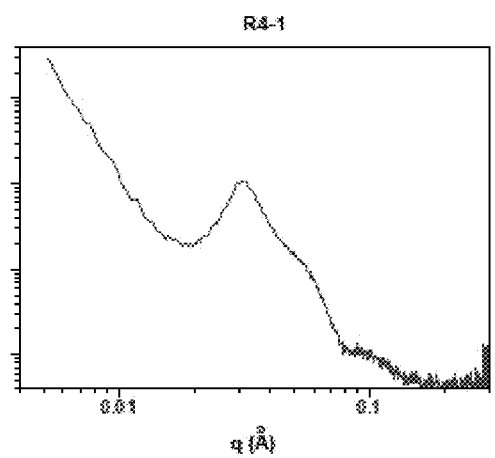
FIG. 28A illustrates a SAXS graph for R4-1.
Figure 28B:
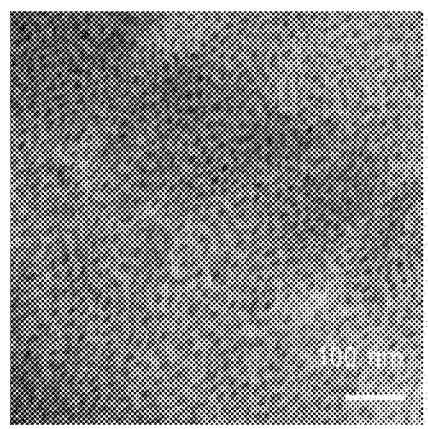
FIG. 28B illustrates a TEM graph for R4-1.
Figure 29A:
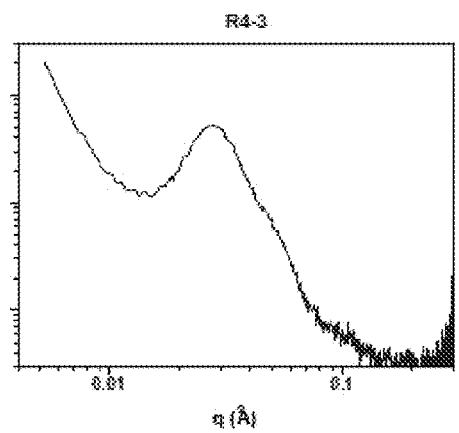
FIG. 29A illustrates a SAXS graph for R4-3.
Figure 29B:
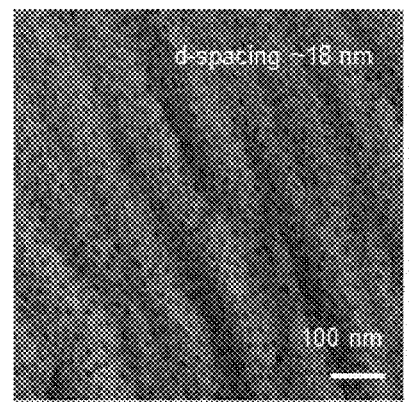
FIG. 29B illustrates a TEM graph for R4-3.

FIG. 23 illustrates the reaction. FIG. 24 illustrates the chain extension by CMS, which occurs in the presence of a hydrocarbon, more specifically xylene, even more specifically o-xylene at a temperature between about 95° C. and about 115° C., in some embodiments about 105° C. to form Pip-b-PCMS. FIG. 25 illustrates the quaternization by TTMOPhP or TPhP. FIG. 25 also illustrates the different examples of "R" that can be used in the reaction. Table 1 illustrates Pip-PCMS chemical compositions and morphology.

TABLE 1

| | PIp | | | Pip-PCMS | | | Pip-PP + MS | | | |
|---|---|---|---|---|---|---|---|---|---|---|
| Sample | Mn (kg/mol) | Mw (kg/mol) | Đ | Mn (kg/mol) | Mw (kg/mol) | Đ | IEC (mmol/g) | d-spacing (nm) | M | f |
| R3-2 | 54,506 | 62,035 | 1.14 | 46,735 | 88,762 | 1.89 | 0.909 | 41 | S | 88 |
| R3-3 | | | | 59,639 | 110,081 | 1.84 | 0.929 | 70 | S | 92 |

TABLE 1-continued

| | PIp | | | Pip-PCMS | | | Pip-PP + MS | | | |
|---|---|---|---|---|---|---|---|---|---|---|
| Sample | Mn (kg/mol) | Mw (kg/mol) | Đ | Mn (kg/mol) | Mw (kg/mol) | Đ | IEC (mmol/g) | d-spacing (nm) | M | f |
| R4-1 | 8,119 | 9,373 | 1.15 | 20,969 | 28,479 | 1.35 | 0.871 | 20 | H | 80 |
| R4-3 | | | | 21,597 | 28,957 | 1.34 | 0.883 | 23 | H | 82 |

With regard to Pip and Pip-PCMS, the molecular weight and dispersity were from THF GPC. The molecular weight of PCMS block was calculated by subtracting the first PIp block from PIp-PCMS diblock copolymer. The IEC was a theoretical ion exchange capacity, calculated from NMR. The d-spacing was calculated from SAXS. With regard to morphology, M, "S" is sphere and "H" is hexagonal cylinder. The volume fraction (f) of the ionic block was calculated by densities. FIGS. 26A-29B illustrate the SAXS and TEM graphs for R3-2, R3-3, R4-1 and R4-3, respectively.

Figure 30:
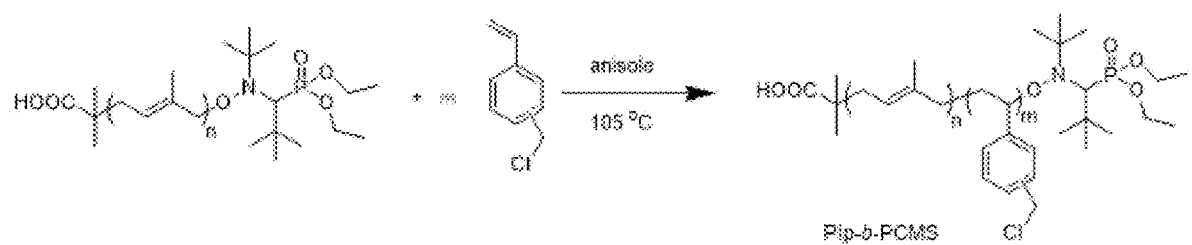
FIG. 30 illustrates a PIp-PCMS chain extension in anisole.
Figure 31:
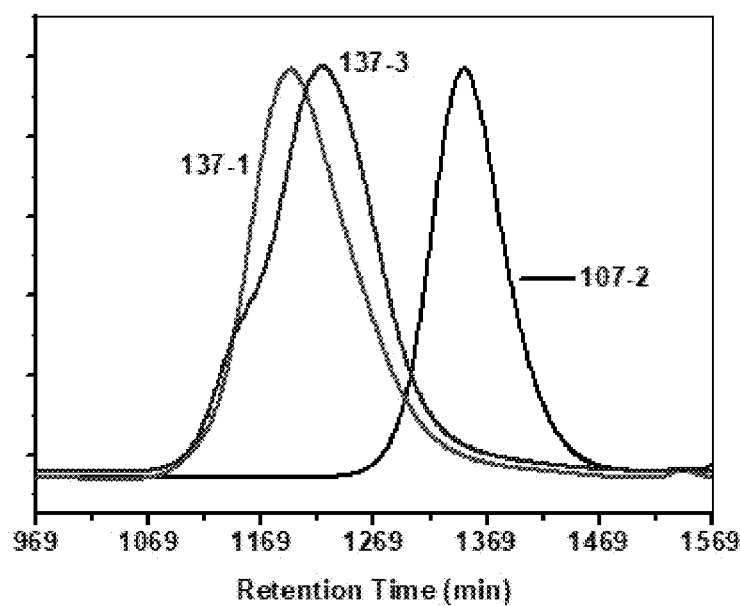
FIG. 31 illustrates retention times for two samples discussed in Table 2 and an additional sample.
Figure 32:
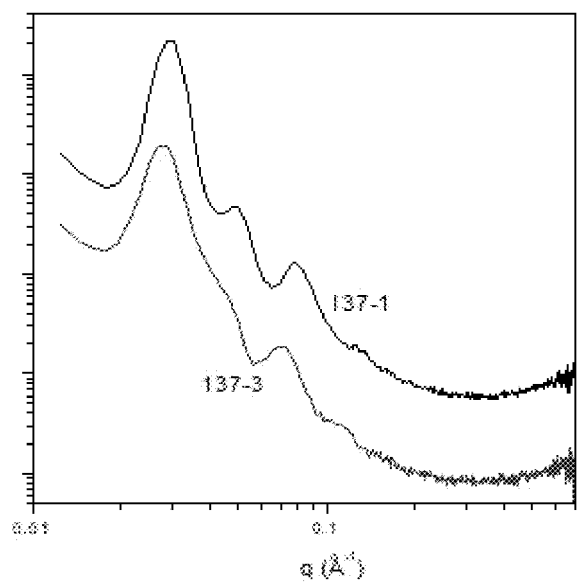
FIG. 32 illustrates SAXS graphs for two samples discussed in Table 2.
Figure 33A:
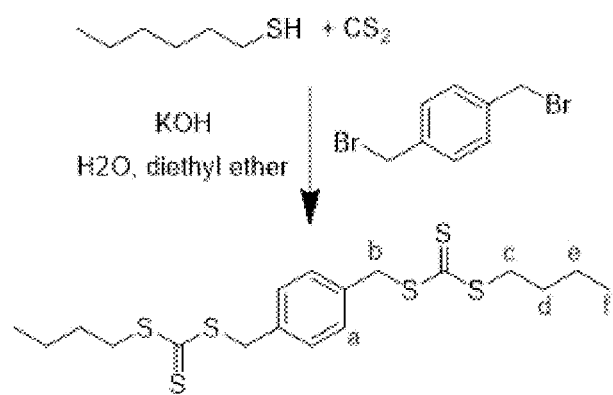
FIG. 33A illustrates a material produced by a reaction, as well as the reactants.
Figure 33B:
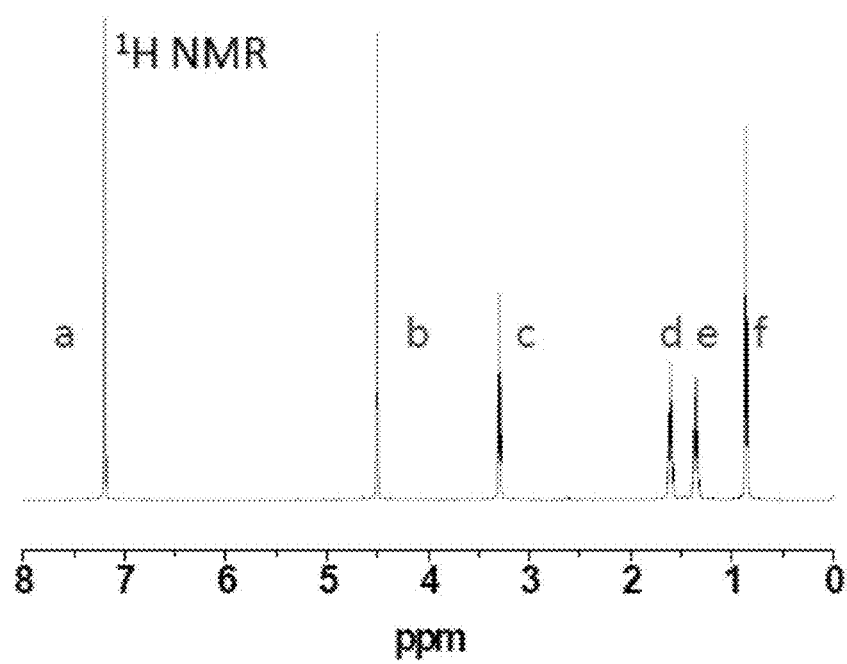
FIG. 33B illustrates the NMR for the material of FIG. 33A.
Figure 33C:
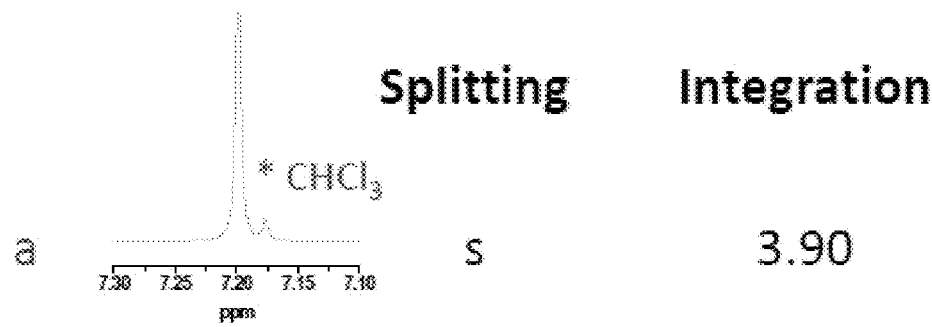
FIG. 33C illustrates the NMR, splitting and integration for "a" illustrated in FIG. 33A.
Figure 33D:
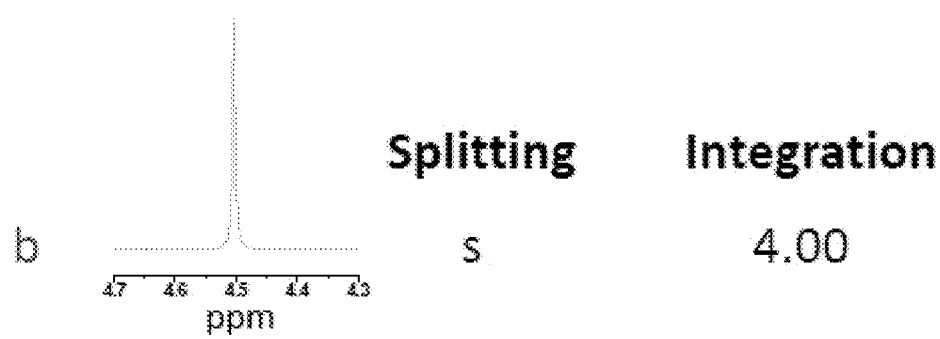
FIG. 33D illustrates the NMR, splitting and integration for "b" illustrated in FIG. 33A.
Figure 33E:
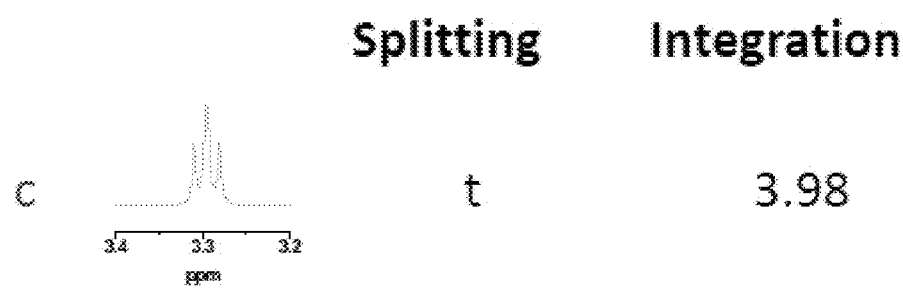
FIG. 33E illustrates the NMR, splitting and integration for "c" illustrated in FIG. 33A.
Figure 33F:
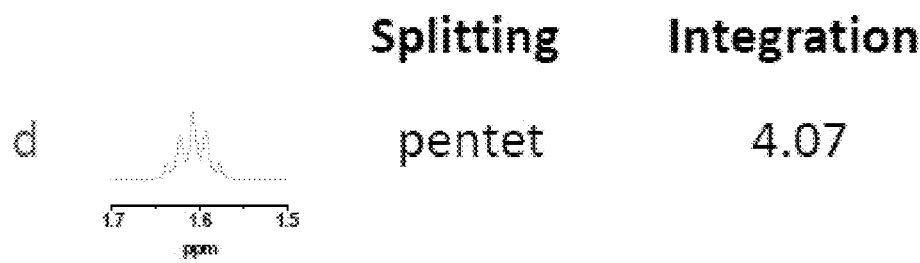
FIG. 33F illustrates the NMR, splitting and integration for "f" illustrated in FIG. 33A.
Figure 33G:
FIG. 33G illustrates the NMR, splitting and integration for "e" illustrated in FIG. 33A.
Figure 33H:
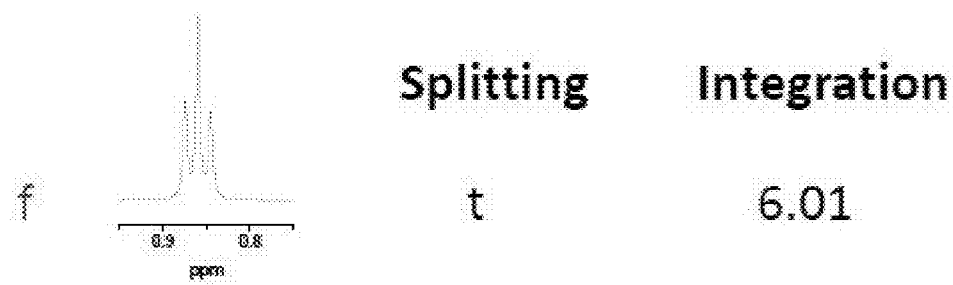
FIG. 33H illustrates the NMR, splitting and integration for "f" illustrated in FIG. 33A.

FIG. 30 illustrates a PIp-PCMS chain extension in anisole. Table 2 illustrates the properties of PIp, PIp-PCMS and PCMS. FIGS. 31 and 32 illustrates the retention time and a SAXS graphs for the samples in Table 2.

| | PIp | | | PIp-PCMS | | | | | |
|---|---|---|---|---|---|---|---|---|---|
| Sample | $M_n$ (kg/mol) | $M_w$ (kg/mol) | PDI | Conv (%) | $M_n$ (kg/mol) | $M_w$ (kg/mol) | PDI | PCMS Mn (kg/mol) | |
| 137-1 | 10,850 | 12,492 | 1.15 | 46,735 | 32,429 | 41,099 | 1.27 | 21,579 | |
| 137-3 | | | | 59,639 | 27,084 | 35,871 | 1.32 | 16,234 | |

FIG. 33A-33H illustrate a material, an NMR for the material, as well as the splitting and integration for each identified bond (a-f).

Figure 34A:
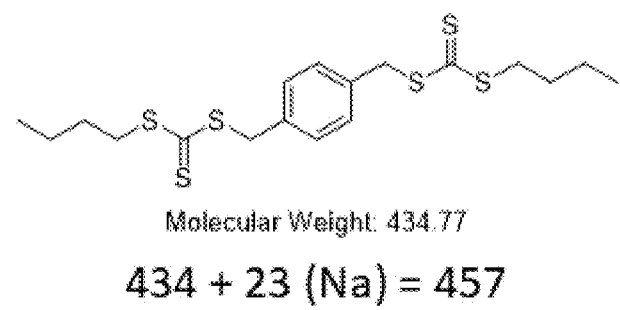
FIG. 34A illustrates the PCMS-PIp-PCMS difunctional RAFT CTA synthesis material.
Figure 34B:
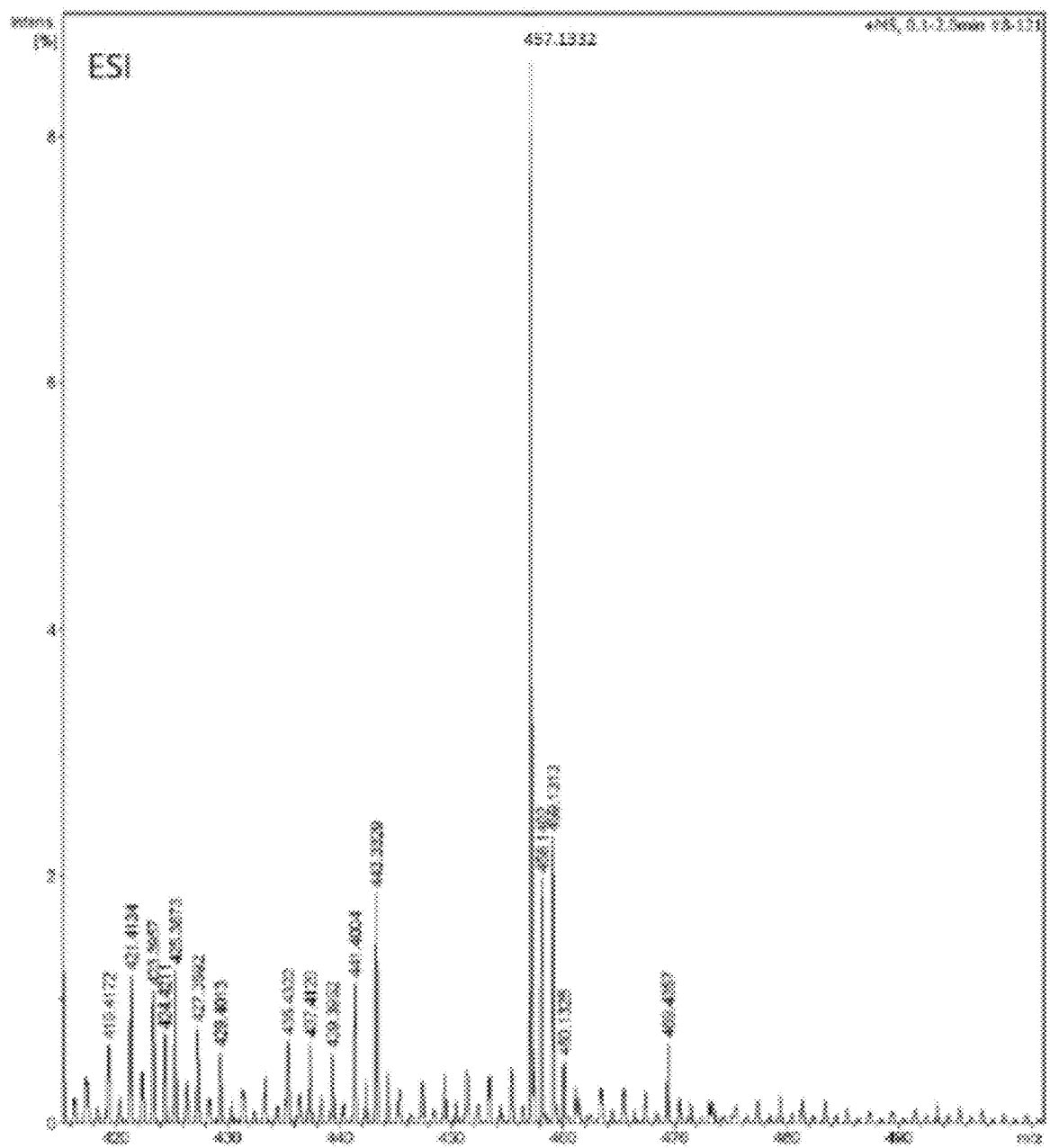
FIG. 34B illustrates the intensity of the material.
Figure 35:
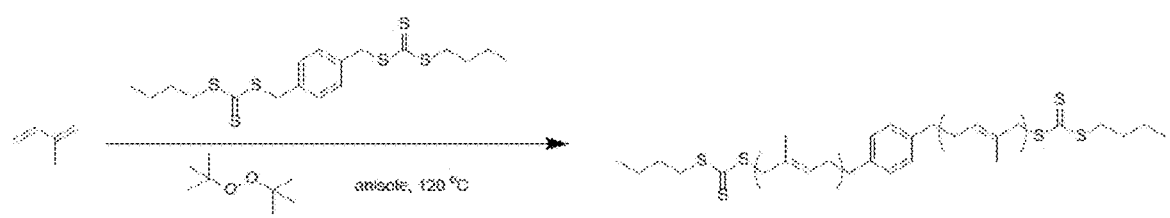
FIG. 35 illustrates PCMS-PIp-PCMS: Telechelic PIp Synthesis.
Figure 36:
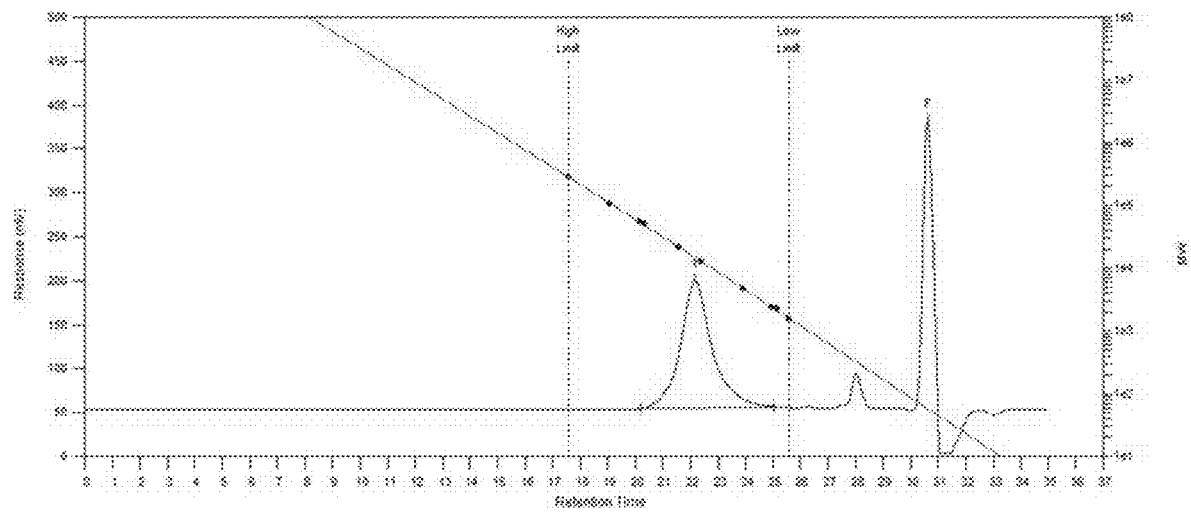
FIG. 36 illustrates properties of the material of FIG. 35.
Figure 37:
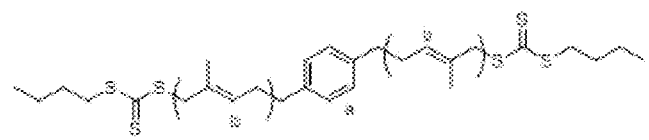
FIG. 37 illustrates a material with different locations on the material marked.
Figure 38:
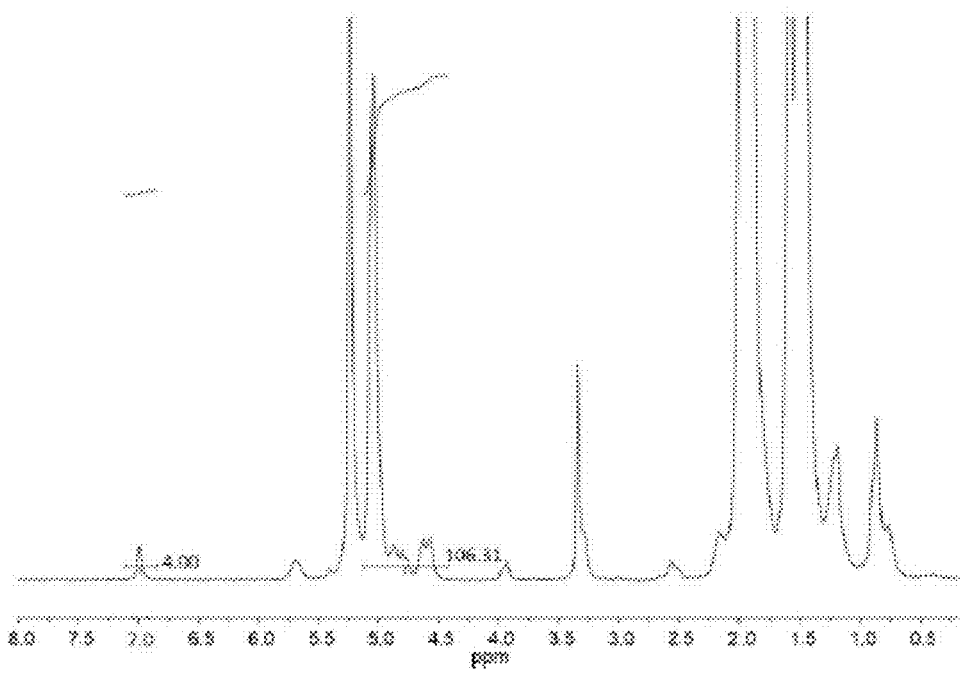
FIG. 38 illustrates properties of the material of FIG. 37, with different locations illustrated.
Figure 39:
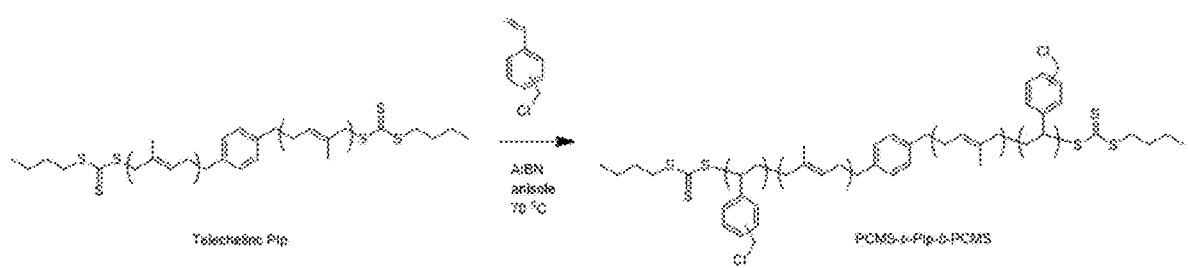
FIG. 39 illustrates a reaction of the present invention.

FIG. 34A illustrates a material, while FIG. 34B illustrates the intensity of this material. FIG. 35 illustrates PCMS-PIp-PCMS: Telechelic PIp synthesis. FIG. 36 illustrates properties of the material of FIG. 35. FIG. 37 illustrates a material with different locations on the material marked. FIG. 38 illustrates properties of the material of FIG. 37, with different locations illustrated. FIG. 39 illustrates a reaction of the present invention.

Quaternary phosphonium containing polymers showed excellent solubility in a variety of solvents, DMF, alcohols, toluene, dichloromethane and chloroform, etc. Excellent solvent processability provides great convenience for membrane fabrication, domain alignment and catalyst/electrode assembly. Additionally, as the basicity of the quaternary phosphonium hydroxide is much higher than that of the ammonium counterpart, phosphonium based ionomer exhibits decent hydroxide conductivity. Finally, unlike most of ammonium, or ordinary aliphatic alkyl based quaternary phosphonium ions, which have serious instability problems, bulky phosphonium exhibited excellent alkaline stability, phenyl groups take part in conjugation and serve as strong electron donors. Besides, the high steric bulk of tris(2,4,6-trimethoxyphenyl) substituent group also protects the core phosphine and the α-carbon atom against hydroxide attack.

An aspect of the invention is a method of cross-linking the mid-block of a triblock polymer. The method includes the steps of selecting a triblock polymer, where the structure of the polymer is "A-B-A". Unit A is hydrophilic and is independently selected from the group consisting of a halogenated polyvinyl benzyl and a halogenated polymethyl styrene. Unit B is hydrophobic and independently selected from the group consisting of a polyisoprene, a polycycloctene, a polycycloocadiene, and a polycyclooctatriene. The triblock polymer is dissolved in a solvent with a photo initiator and a alkyl dithiol to form a solution. The solution is placed on a substrate and evaporated to make a film on the substrate. UV radiation is applied to the film, thereby crosslinking double bonds in unit B of the triblock polymer to produce a crosslinked triblock A-B-A polymer.

Unit A can be first converted to a cationic polymer by quaternizing with a base. The base can be selected from the group consisting of trimethyl amine, trihexylamine, methylpyrolidine, methylpiperidine, hexyl pyrrolidine and hexylpiperidine. In some embodiments, the halogen of the halogenated polyvinyl benzene or halogenated polymethyl styrene can be chloride.

The substrate can be glass, polytetrafluoroethylene, polyether ether ketone (PEEK), or a polyimide (e.g. Kapton®). The photo initiator can be 2-Hydroxy-4'-(2-hydroxyethoxy)-2-methylpropiophenone. In some embodiments, the cation can be a trimethyl benzyl ammonium, a benzyl tris(2,4,6-trimethoxyphenyl) phosphonium, a benzylmethylpiperidinium, a benzylhexylpiperidinium, a benzylmethylpyrrolidinium, a benzylhexylpyrrolidium, an attached hexylmethylpyrrolidinium, an attached hexylhexylpyrrolidinium of any combinations thereof of two or more of these cations.

Unit B can be directly cross-linked by a method chosen from radical generation with ionizing radiation and a radical initiator such as AIBN and heat or UV radiation. Unit B, which is hydrophobic, can be cross-linked by application of a diphenolic and base chosen from KOH, NaOH, potassium carbonate, and potassium bicarbonate, or combinations thereof.

An aspect of the invention is a method of hydrogenating a triblock polymer. The method includes selecting a triblock polymer, where the structure of the polymer is "A-B-A." Unit A is independently selected from the group consisting of a halogenated polyvinyl benzyl and a halogenated polymethyl styrene and the unit B is independently selected from the group consisting of a polyisoprene, a polycycloctene, polycycloocadiene, and a polycyclooctatriene. The triblock polymer and p-toluenesulfonyl hydrazide are dissolved in a solvent to form a solution. The solution is heated to hydrogenate the polymer. The polymer is precipitated from the solvent and cleaned to remove a hydrazine by-product. The resulting polymer is dissolved in a solution and added to a substrate, which is then evaporated to make a film on the substrate. Unit A is converted to a cationic polymer by quaternizing with a base.

In some embodiments of the invention, the base is selected from the group consisting of trimethyl amine, methylpyrolidine, methylpiperidine, hexyl pyrrolidine and hexylpiperidine. The halogen of the halogenated unit A polymer can be chloride. The substrate can be glass, polytetrafluoroethylene, polyether ether ketone (PEEK), or a polyimide. The material can be directly halogenated with a hydrogen at any point.

An aspect of the invention is a method of cross-linking the halogenated outer-blocks of a triblock polymer. The method includes selecting a triblock polymer, the polymer consisting of a structure A-B-A. Unit A is independently selected from the group consisting of a halogenated polyvinyl benzyl and a halogenated polymethyl styrene and the unit B is independently selected from the group consisting of a polyisoprene, a polycycloctene, a polycyclooctadiene, and a polycyclooctatriene. The triblock polymer is dissolved in a solution then the solution is added to a substrate. The solvent is evaporated to make a film on the substrate before it is treated with a di-base selected from the group, 1,3-Di-4-piperidylpropane, 1,6-Di-4-piperidylhexane, 1,3-Di-4-pyrolidylpropane, 1,6-Di-4-pyrolidylhexane, 1,3-Dimethylaminepropane and 1,6-Dimethylaminehexane, or combinations thereof. The film is quaternized with an alkyl iodide chosen from methyl iodide and hexyl iodide to obtain an anion exchange membrane. The film is exchanged into any other anionic form chosen from chloride, bromide, hydroxide, carbonate, bicarbonate, tetrafluoroborate.

An aspect of the invention is a method of cross-linking the hydrophilic outer-blocks of a triblock polymer. The method includes the steps of selecting a triblock polymer, the polymer consisting of a structure A-B-A, wherein unit A is independently selected from the group consisting of a halogenated polyvinyl benzyl and a halogenated polymethyl styrene and the unit B is independently selected from the group consisting of a polyisoprene, a polycycloctene, a polycyclooctadiene, and a polycyclooctatriene. The polymer is dissolved in a solution and added to a substrate. The solvent is evaporated to produce a film on the substrate. The film is heated to above the temperature of chlorine stability to form crosslinks and treating with a dibase selected from the group, 1,3-Di-4-piperidylpropane, 1,6-Di-4-piperidylhexane, 1,3-Di-4-pyrolidylpropane, 1,6-Di-4-pyrolidylhexane, 1,3-Dimethylaminepropane and 1,6-Dimethylaminehexane, and combinations thereof. The film is quaternized with an alkyl iodide chosen from methyl iodide and hexyl iodide to obtain an anion exchange membrane. The film is exchanged into any other anionic form chosen from chloride, bromide, hydroxide, carbonate, bicarbonate, tetrafluoroborate.

EXAMPLES

Example 1

Figure 1B:
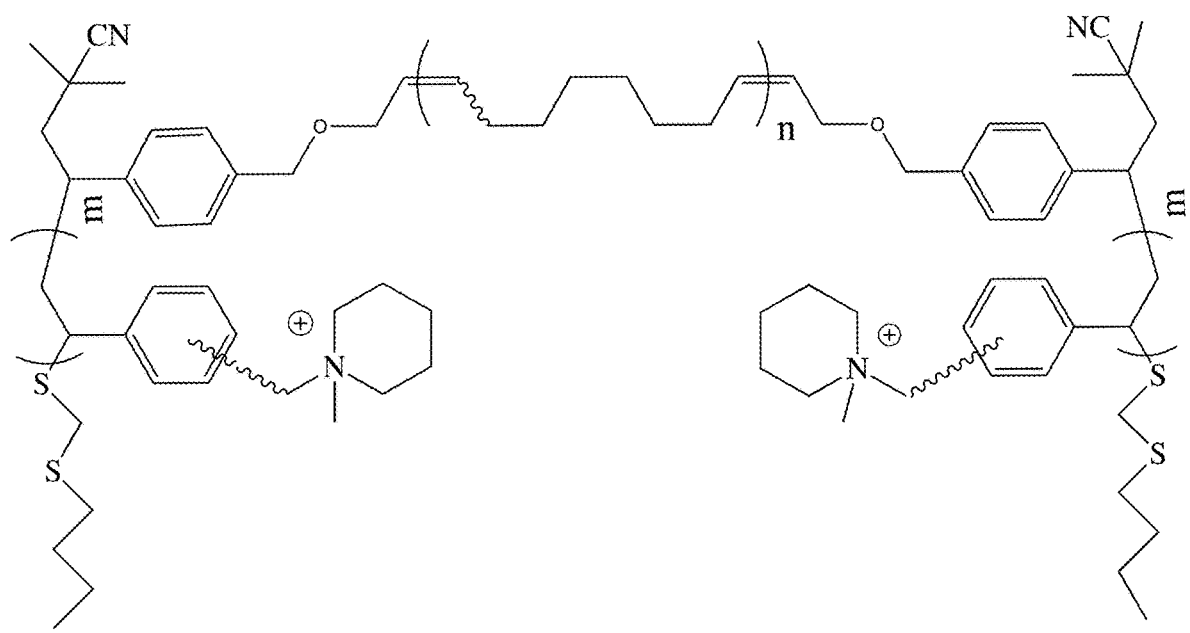
FIG. 1B illustrates a polyvinylbenzyl chloride-b-polycyclooctene-b-polyvinylbenzyl chloride triblock.

Polyisoprene-r-polyvinyl benzyl chloride based random polymer (illustrated in FIG. 1A) and polyvinyl benzyl chloride-b-polycyclooctene-b-polyvinyl benzyl chloride triblock polymer backbones (illustrated in FIG. 1B) were studied. Selection of these backbones is due to polyisoprene and polycyclooctene having low glass transition temperature (Tg) that makes the membranes flexible and elastic to handle. It was envisioned that the random materials would act as an ionomer and the triblock material as a membrane. The random polyisoprene-polyvinyl benzyl chloride based random polymers after functionalizing with trimethyl ammonium or methyl piperidinium cations, gave materials with high IEC, (greater than 3.0 mmol/g), but these high IECs led to materials with compromised mechanical strength, i.e. not suitable for membrane formation, but with the chemical stability needed for use in electrodes. The polyvinyl benzyl chloride-co-polycyclooctene triblock functionalized with methyl piperidinium had IECs as high as 2.0 mmol/g and gave a phase separated lamellar morphology leading to a higher conductivity and good membrane forming properties at least in the dry state.

Cation Selection

Four cation species were studied, the standard trimethylbenzyl ammonium cation which is known to have substandard chemical stability but is the standard benchmark due to its ease of stability and common usage. Tris(2,4,6-trimethoxyphenyl) phosphonium (TTMPP) was selected as it is bulky and contains electron-donation functional group which is thought to be make it more hydroxide stable than the benchmark benzyl trimethyl ammonium cation. Dimethylpiperidinium has been recently proposed to be very chemically stable due to the geometric constraint of the six-membered ring on the elimination transition state. Dimethylpyrrolidinium is also thought to have high stability due to β proton in the non-anti-periplanar position. The chlorinated polymers where therefore quaternized to give, benzyl trimethyl ammonium (BTMA) benzyl TTMPP, benzyl methylpiperidinum (MPRD), and benzyl methyl pyrrolidinium (MPY) cations. The first materials described below all had moderate IECs of around 1.3 meq $g^{-1}$.

Figure 2:
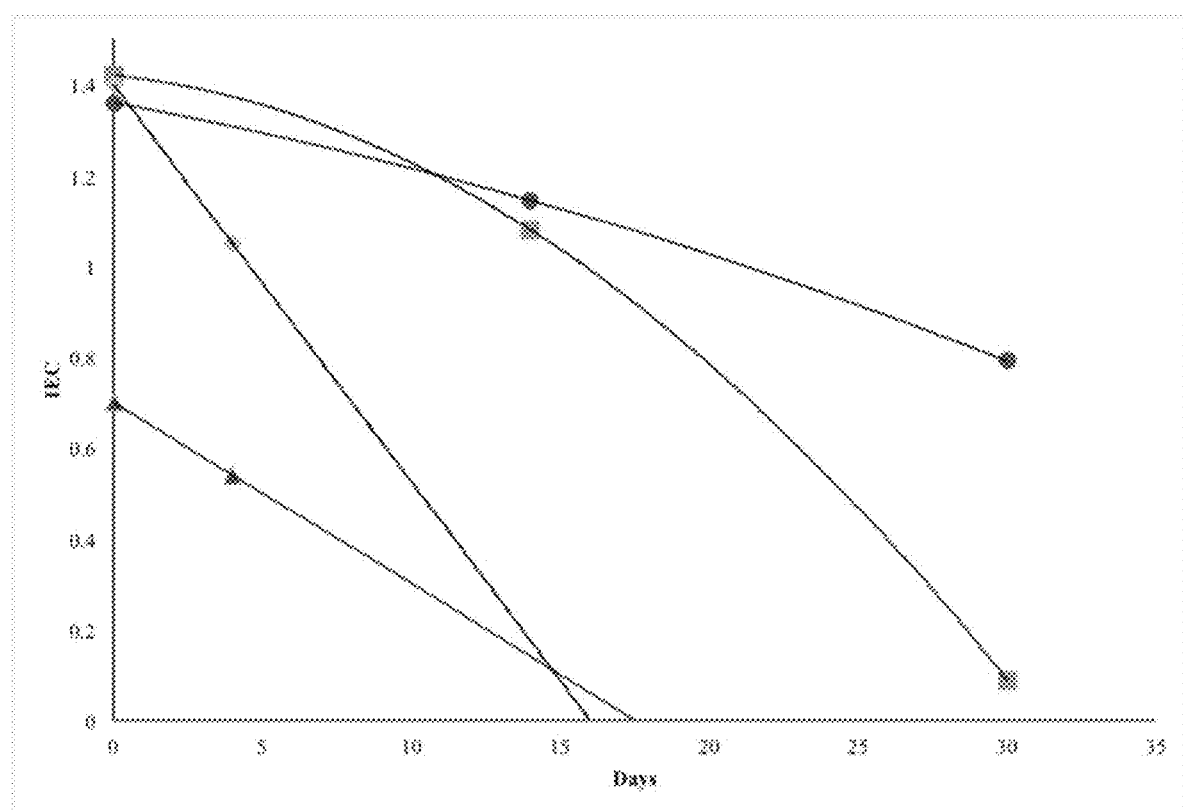
FIG. 2 illustrates a comparison of durability between a first generation of cation functionalized PCMS-PCOE-PCMS-BTMA (diamonds), a second generation of cation functionalized PCMS-PCOE-PCMS-MPRD (circles), a third type of cation functionalized PCMS-PCOE-PCMS-MPY (squares), and a fourth type of cation functionalized PCMS-PCOE-PCMS-TTMPP (triangles) by soaking in 1 M KOH at 80° C.

The chemical durability of PCMS-PCOE-PCMS-MPRD was compared to the polymers that with same polycyclooctene triblock backbone but have been functionalized with methylpyrrolidinium, tris(2,4,6-trimethoxyphenyl) phosphonium and trimethyl ammonium. The results are illustrated in FIG. 2. Membranes were soaked in 1 M KOH at 80° C. for 14 days and 30 days respectively. Compared to the $1^{st}$ generation BTMA cation functionalized polymer (diamonds), the $2^{nd}$ generation cation functionalized films (PCMS-PCOE-PCMS-MPRD (circles), PCMS-PCOE-PCMS-MPY (squares) and PCMS-PCOE-PCMS-TTMPP (triangles)) show improved durability. But, both PCMS-PCOE-PCMS-MPY and PCMS-PCOE-PCMS-TTMPP degraded faster than PCMS-PCOE-PCMS-MPRD. PCMS-PCOE-PCMS-MPRD has 15.8% loss in IEC after 14 days, and 42% loss in IEC after 30 days, which is much more stable compared to BTMA which degrades 25% after 4 days by soaking in 1 M KOH at 80° C.

Figure 3:
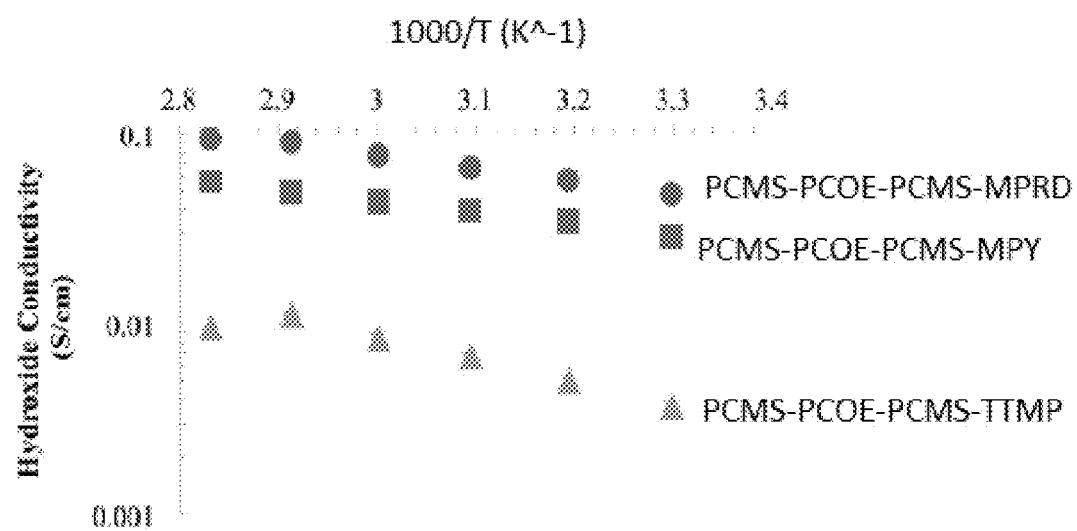
FIG. 3 illustrates a comparison of hydroxide conductivities between PCMS-PCOE-PCMS-MPRD (circles), PCMS-PCOE-PCMS-MPY(squares), and PCMS-PCOE-PCMS-TTMPP (triangles)

The hydroxide conductivity, illustrated in FIG. 3, of the films was measured under a $CO_2$ free environment, using UHP nitrogen gas. PCMS-PCOE-PCMS-TTMPP (triangles) gave a lower conductivity due presumably to degradation above at 70° C. while conductivities of PCMS-PCOE-PCMS-MPRD (circles), and PCMS-PCOE-PCMS-MPY (squares) keep increasing from 30° C. to 80° C. due to the higher stabilities. It is possible to measure the hydroxide conductivity of well phase separated polymers with BTMA cations at temperatures<80° C. PCMS-PCOE-PCMS-MPRD (IEC=1.36 mmol/g) had the highest conductivity, 95 mS/cm at 80° C., then PCMS-PCOE-PCMS-MPY (IEC=1.42 mmol/g), even though IEC is slight smaller.

None of these films survived testing at ProtonOnSite, because the films became too mechanically weak when swollen in water. This problem was solved by cross-linking the hydrophobic block of the polymer by photo-crosslinking the residual double bonds. In this instance, the crosslinking occurred with a dithiol. The right level of crosslinking actually enabled an increase the IEC of the material.

Procedure of Membrane Generation and Fabrication

Triblock Copolymer Quaternization with MPRD

A 250 mL conical flask was charged with 50 mL of MPRD (pure) and purged with dry Nitrogen for 15 min. Precursor triblock copolymer ((PCMS)$_{107.5}$-(PCOE)$_{344}$-(PCMS)$_{107.5}$, ca 2 g) was then added to the flask with vigorous stirring to dissolve the copolymer in MPRD at room temperature. The flask was sealed under a nitrogen environment for 72 h with no active purge. The pale-yellow gel was precipitated in MeOH, washed with MeOH, and then dried in the oven at 30° C. under vacuum overnight. Yield ((PCMS)$_{107.5}$-(PCOE)$_{344}$-(PCMS)$_{107.5}$ w/MRRD): yield of about 2.58 g.

Photo-Cross-Linking

All membranes were prepared by drop-casting from a chloroform solution. ((PCMS)$_{107.5}$-(PCOE)$_{344}$-(PCMS)$_{107.5}$ w/MPRD, 1.64 g) was totally dissolved in chloroform (ca 80 mL) at 45° C. for 3 days. Photo initiator solution (IRGACURE 2959, 0.082 g, 5% wt. of polymer) was then added to the polymer solution. Dithiol cross-linker (110 μL, DT, 7.5%) was added relative to the total amount of PCOE units. The reaction mixture was stirred at room temperature under dark condition for 5 min. The polymer solution was drop cast on a polytetrafluoroethylene sheet, covered with a piece of watch glass, and slowly evaporated the solvent overnight in the dark. Cross-linking of the membranes was achieved by exposure to UV light (Fusion UV systems, Inc. belt speed at 3, 7 runs). These membranes were peeled off the substance and soaked with DI water to remove excess DT.

Thin Film Fabrication

Figure 4:
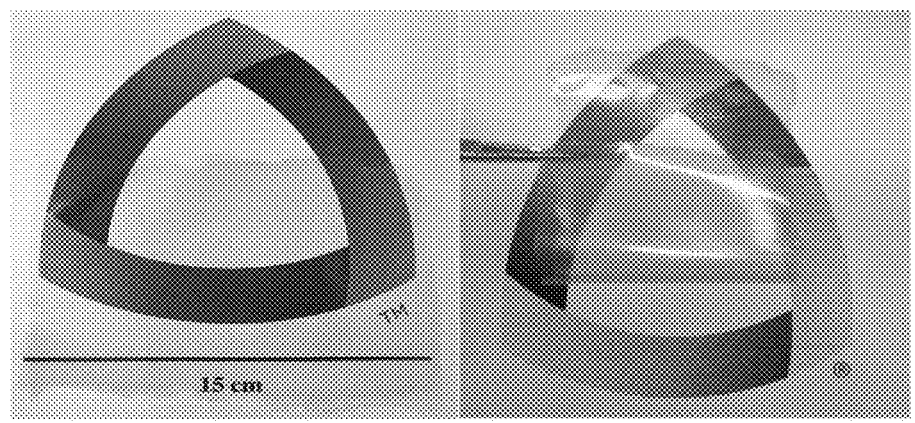
FIG. 4 illustrates photographs of a cross-linked membrane that is approximately 40 microns in thickness.

Membrane fabrication methods used include solvent drop cast, using micrometer applicator and automatic film coater. Modification of the method allows casting of freestanding, uniform films. The polymer was dissolved in a chloroform solvent and thoroughly stirred for 1 h. Then polymer solution was filter with a needle filter and drop cast on a piece of pre-cleaned polytetrafluoroethylene substrate. Due to the low boiling point of chloroform, the solvent evaporation rate was controlled by covering it with a watchable petri dish on top of polymer solution. After the membrane was dried overnight, it was peeled off and moved to the vacuum oven for a second overnight drying stage. Uniform films as thin as 40 μm membrane and >300 cm$^2$ were cast for these studies (FIG. 4).

Adjustment of IEC and Mechanical Property

Figure 5:
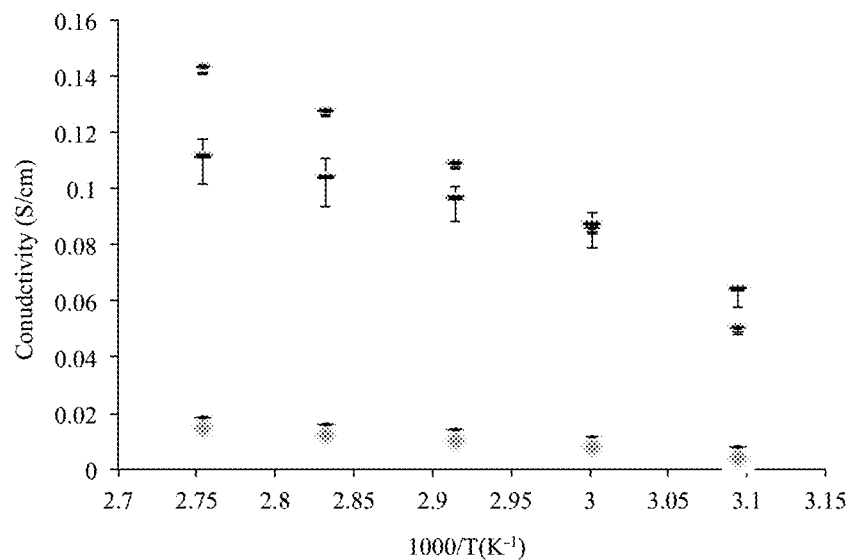
FIG. 5 illustrates a comparison of the conductivity of a piperidinium functionalized triblock membrane produced using a modified functionalization procedure versus the original method (diamond), the modified functionalization procedure included a DCM solvent (square) and a post functionalization (round)

Based on the fact that MPRD quaternized polyvinyl benzyl chloride-co-polycyclooctene triblock polymer had the highest chemical stability, OH$^-$ conductivity and flexibility, this materials was further refined. In order to attach more cationic groups, the functionalization procedure was modified by first using a more compatible solvent that better dissolved the piperidinium triblock polymer allowing adequate contact of the amine solution to the benzyl chloride groups; Secondly the functionalize procedure was modified into post dithiol functionalization by soaking the membrane in an amine solution as the last step. The obtained membrane has improved ion exchange capacity of IEC=2.0 mmol/g with very high Cl$^-$ conductivity over 100 mS/cm at 90° C., 95% RH. FIG. 5 illustrates a piperidinium functionalized triblock membrane produced via modified functionalization procedure (with DCM solvent, square; post functionalization, round) compared to the conductivity of membrane produced with original method (diamond) of the invention.

The membrane with high IEC value is mechanically weak as to a large extent of water absorption. To solve mechanic problem, the hydrophobic domain of the triblock polymer has been photo crosslinked with dithiol and thermal crosslinked hydrophilic domain of the polymer. Suitable dithiols include 1,10-decanedithiol, PI-ran-P[VBTMA][Cl], and combinations thereof. The thermal crosslinking included PI-ran-P[VBTMA][Cl]. The obtained membrane withholds water absorption and dimensional swelling with improved mechanical strength in humid condition. The resulting membrane is thicker for stretch and allowed to operate at mild temperatures above ambient without melting.

Figure 6:
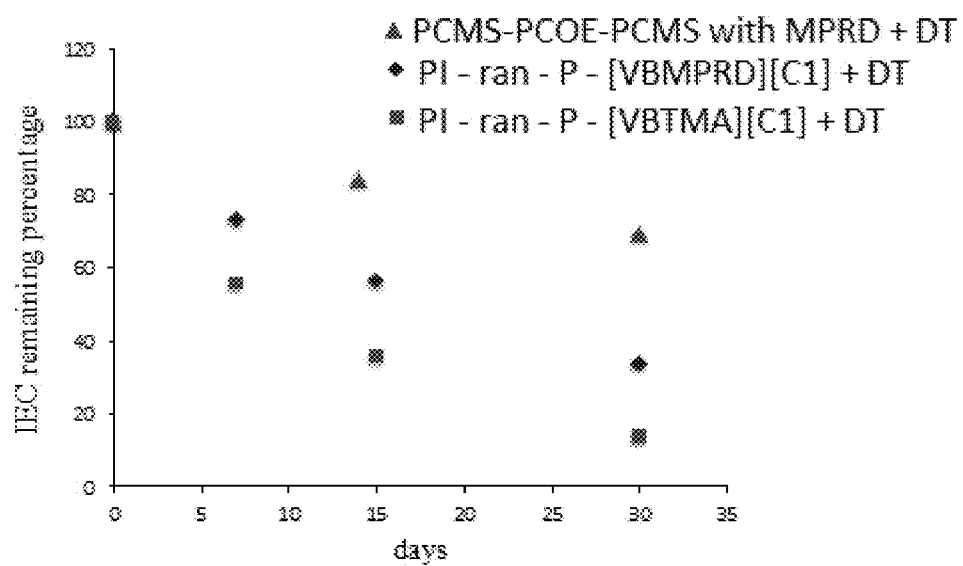
FIG. 6 illustrates a comparison of the durability of a random PI-ran-P-[VBMPRD][Cl]+DT, PI-ran-P-[VBTMA][Cl]+DT and triblock PCMS-PCOE-PCMS with MPRD+DT by soaking in 1 M KOH at 80° C.

From the degradation study of the DT crosslinked materials, 80° C. and 1M KOH, (illustrated in FIG. 6), the same MPRD cation, the triblock copolymer is more hydroxide stable than random polymer, 75% vs<40% remaining after 30 days. This is presumably as it has a well-defined phase separated lamella structure, as proven by HRTEM and SAXS (not shown).

Example 2

Second General Procedure for Quaternization with MPRD

A 250 mL conical flask was charged with 25 mL of N-Methylpiperidine (MPRD) (pure) (C$_6$H$_{13}$N, Acros127480010, 99%) and purged with ultrahigh purity nitrogen for 15 min. A precursor triblock copolymer (PCMS)$_{162.4}$-(PCOE)$_{653}$-(PCMS)$_{162.4}$, ca 2.5 g, dissolved in dichloromethane (DCM) (CH$_2$Cl$_2$, Acros, 268330025, >99%) (ca 50 mL) was then added to the flask with vigorous stirring to dissolve the copolymer in MPRD at room temperature. The flask was sealed under a nitrogen environment for 72 hours with no active purge and stirred at 35° C. A pale-yellow gel was precipitated in MeOH (CH$_3$OH, (Pharmco-Aaper, 339000000, ACS grade), washed with MeOH, and then dried in the oven at 30° C. under a vacuum overnight. The yield of ((PCMS)$_{162.4}$-(PCOE)$_{653}$-(PCMS)$_{162.4}$/MRRD) was approximately 2.92 g.

General Procedure for Quaternization with TMA

A precursor triblock copolymer (PCMS)$_{162.4}$-(PCOE)$_{653}$-(PCMS)$_{162.4}$, ca 1.5 g) was totally dissolved in chloroform (CHCl$_3$, Acros, 390760025, >99%) (20 mL) at 35° C. for 3 hours. The polymer solution was drop casted on a polytetrafluoroethylene sheet and covered with a watch glass to decelerate the solvent evaporation. The polymer membrane was easily peeled off from the polytetrafluoroethylene sheet and treated with trimethylamine solution, (TMA), (C$_6$H$_3$N, Aldrich W324108, 25 wt. % in water) (25 wt. %) for at least 3 days at room temperature for the solid state quaternization reaction. The quaternized polymer was washed with DI water then dried in the air. The quaternized polymer membrane was hot-pressed at 100° C. for 3 min (90 psi).

Photo-Cross-Linking Procedure for (PCMS)$_{162.4}$-(PCOE)$_{653}$-(PCMS)$_{162.4}$ w/MPRD All membranes were prepared by drop-casting from a chloroform solution. A portion of the yield ((PCMS)$_{162.4}$-(PCOE)$_{653}$-(PCMS)$_{162.4}$ w/MPRD, 1.15 g) was totally dissolved in chloroform (ca 30 mL) at 40° C. for two days. Photo initiator solution (2-Hydroxy-4'-(2-hydroxyethoxy)-2-methylpropiophenone, HOCH$_2$CH$_2$OC$_6$H$_4$COC(CH$_3$)$_2$OH (IRGACURE 2959, Aldrich, 410896, 98%) (IRGACURE 2959, 15 mg/l mL, 3.83 mL, 5% wt. of polymer) was then added to the polymer solution. FIG. 7 illustrates the addition of dithiol cross-linker (135 μL, 1, 10-Decanedithiol (DT) (SH(CH$_2$)$_{10}$SH, Alfa Aesar, L11064, 95%) 12.5%) was added relative to the total amount of PCOE units. The reaction mixture was stirred at room temperature under dark condition for 5 min. The polymer solution was drop casted on a polytetrafluoroethylene sheet, covered with a piece of watch glass, and the solvent was slowly evaporated overnight in the dark conditions. Cross-linking of the membranes was achieved by exposure to UV light (Fusion UV systems, Inc. belt speed at 3, 7 runs). These membranes were washed with DI water to remove excess DT.

General Procedure for Hydrogenation of Triblock Polymer with TSH

The hydrogenation of $(PCMS)_{162.4}$-$(PCOE)_{653}$-$(PCMS)_{162.4}$ using a diimide derived from the thermal decomposition of p-toluenesulfonyl hydrazide (TSH) (p-toluenesulfonyl hydrazide, $C_7H_{10}N_2O_2S$, Aldrich, 132004, 97%) yields linear poly(octane) with the same molecular weight distribution.

A portion of the yield ($(PCMS)_{162.4}$-$(PCOE)_{653}$-$(PCMS)_{162.4}$, 3.4 g, 0.0183 mol repeat units) was totally dissolved in ρ-xylene (450 mL) in a 500 mL, two-necked, round-bottomed flask at room temperature. The flask was immersed in an oil bath and the polymer solution was stirred and heated at 125° C. TSH (27 g, 0.146 mol, eight-fold excess) was added slowly to the polymer solution. The reaction mixture was stirred at 125° C. for additional 2.5 hours. The hot solution was added slowly to excess methanol (ca 2200 mL) and of $(PCMS)_{162.4}$-hydrogenated $(PCOE)_{653}$-$(PCMS)_{162.4}$ precipitated as a white powder. Methanol was removed via filtration. The polymer powder was suspended in boiling DI water (ca 1000 mL) to remove the excess hydrazide. The recovered polymer powder was collected on the filter funnel with fritted disc (medium), washed with methanol, and dried under vacuum at 35° C. overnight. The yield was approximately 3.36 g (98.82%).

General Procedure for Hydrogenated-Triblock Polymer Quaternization with MPRD

The hydrogenated polymer was suspended in xylenes, then casted the polymer solution on the polytetrafluoroethylene sheet. The mixture was evaporated some solvent and hot pressed at 130° C. or 180° C. separately. The hydrogenated triblock polymer membrane was treated with MPRD (25 wt. %) methanol solution at 35° C. for 4 days. The quaternized polymer was washed with DI water then annealed in DI water at 80° C. for 24 hours.

General Procedure for Hydrogenated-Triblock Polymer Quaternization with TMA

The hydrogenated polymer was suspended in xylenes, then the polymer solution was cast upon a polytetrafluoroethylene sheet. The mixture was evaporated some solvent and hot pressed at 130° C. or 180° C. separately. The hydrogenated triblock polymer membrane was treated with TMA (25 wt. %) aqueous solution at 35° C. for 4 days. The quaternized polymer was washed with DI water then annealed in DI water at 80° C. for 24 hours.

Preparation of Triblock Polymer with DPRPP then Quaternation with Iodomethane

A precursor triblock copolymer $(PCMS)_{162.4}$-$(PCOE)_{653}$-$(PCMS)_{162.4}$, ca 1.5 g) was totally dissolved in chloroform (20 mL) at 35° C. for 3 hours. The polymer solution was drop cast on a polytetrafluoroethylene sheet and covered with a watch glass to decelerate the solvent evaporation. The triblock polymer membrane or triblock/DT membrane was treated with 4,4'-Trimethylenedipiperidine, DPRPP ($C_{13}H_{26}N_2$, 1,3-Di-4-piperidylpropane, Aldrich, 121207, 97%) in methanol (0.25 M) at 50° C. for 20 hours separately. These membranes were rinsed with methanol and DI water then dried over a snorkel overnight. These membranes were quaternized with iodomethane ($ICH_3$, Aldrich, 18507, 99%) in methanol (2 M) at 37° C. for 48 hours then washed with methanol. The resulting membranes were treated in a 1 M LiCl (lithium chloride, Acros, 199885000, 99%) in methanol at 50° C. for 40 hours to change the counter-ion from $I^-$ to $Cl^-$ form. The membranes were washed with methanol and DI water, socked in DI water for 1 hour, then dried over a snorkel.

General Procedure for Quaternization with HPRD

1-Hexylpiperidine (HPRD) was synthesized by alkylation of piperidine ($C_5H_{11}N$, Aldrich, 411027, ≅99.5%) and 1-hexanol ($C_6H_{14}O$, Aldrich, H13303, 98%) with catalyst iridium (N-heterocyclic carbene). A 250 mL conical flask was charged with 25 mL of HPRD in methanol and purged with UHP Nitrogen for 15 min. A precursor triblock copolymer $(PCMS)_{162.4}$-$(PCOE)_{653}$-$(PCMS)_{162.4}$, ca 2.5 g) dissolved in DCM (ca 50 mL) was then added to the flask with vigorous stirring to dissolve the copolymer in HPRD at room temperature. The flask was sealed under a nitrogen environment for 72 hours with no active purge and stirred at 35° C. The pale-yellow gel was precipitated in MeOH, washed with MeOH, and then dried in the oven at 30° C. under vacuum overnight. The yield was $((PCMS)_{162.4}$-$(PCOE)_{653}$-$(PCMS)_{162.4}$/HRRD).

Results

Figure 12:
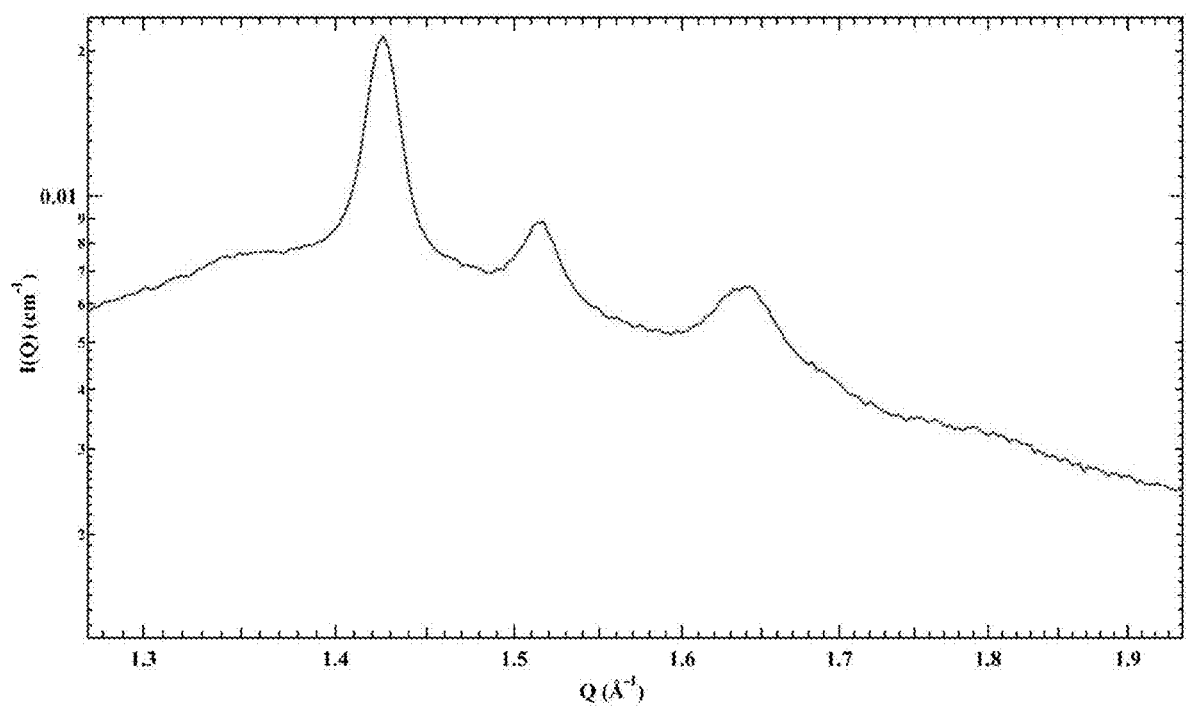
FIG. 12 illustrates wide angle x-ray scattering (WAXS) pattern of ABA triblock polymer backbone—PCMS-PCOE-PCMS (polychloromethylstyrene-polycyclooctene-polychloromethylstyrene)
Figure 13:
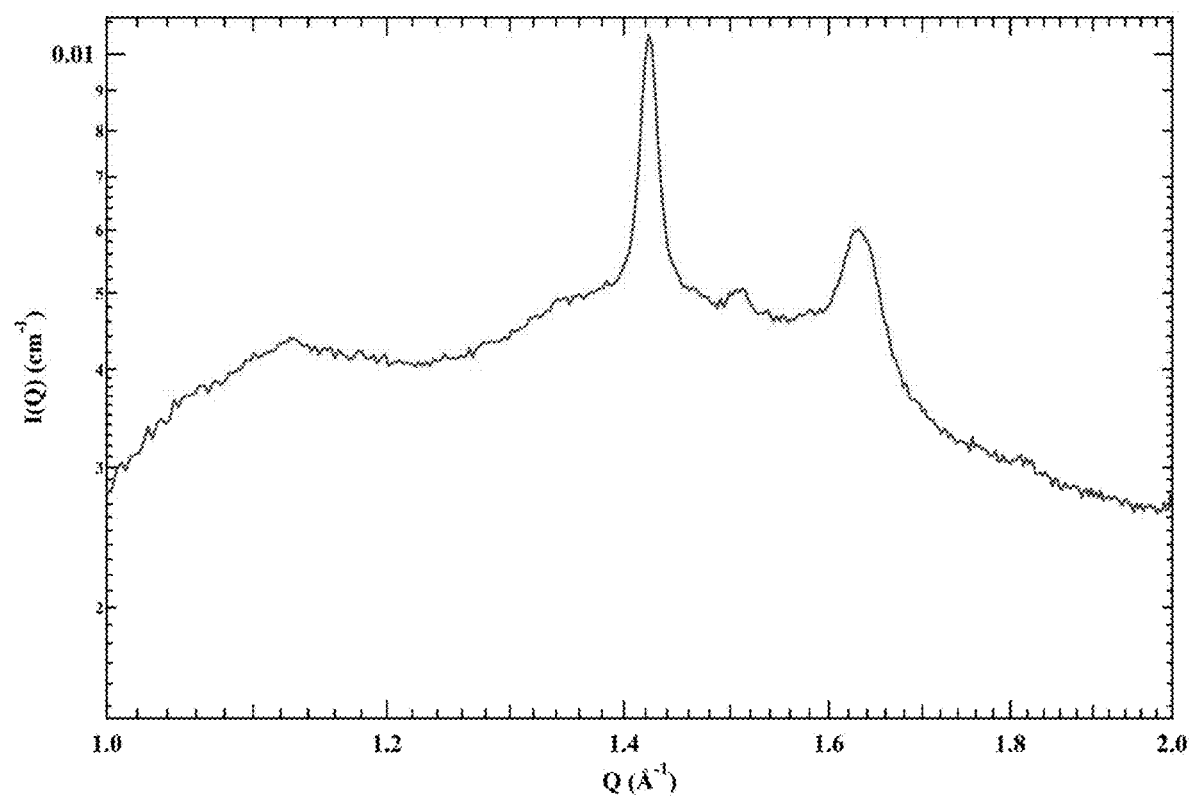
FIG. 13 illustrates a WAXS pattern of ABA triblock polymer quaternized with BMPRD cation—PCMS-PCOE-PCMS [BMPRD] (polychloromethylstyrene-polycyclooctene-polychloromethylstyrene[benzyl-dimethylpiperidinium])
Figure 14:
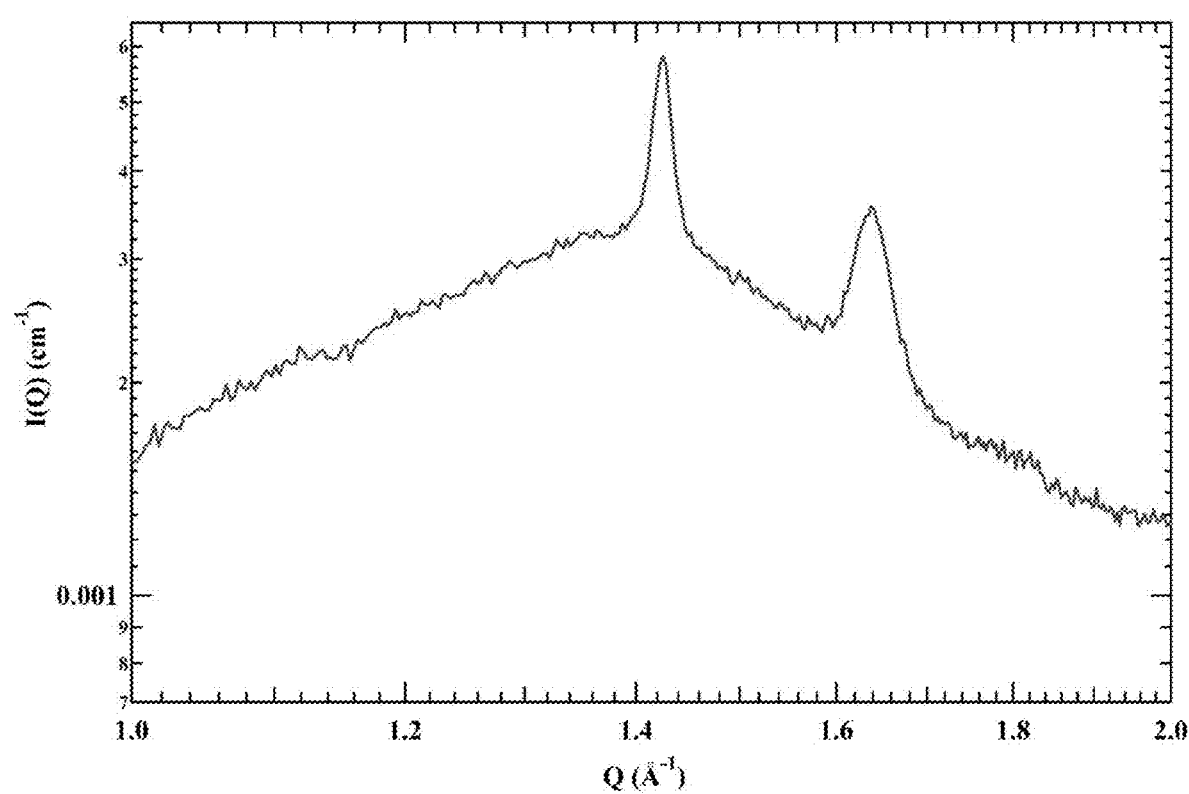
FIG. 14 illustrates a WAXS pattern of ABA triblock polymer quaternized with BTMA cation—PCMS-PCOE-PCMS [BTMA] (polychloromethylstyrene-polycyclooctene-polychloromethylstyrene[benzyl-trimethylamine])
Figure 15:
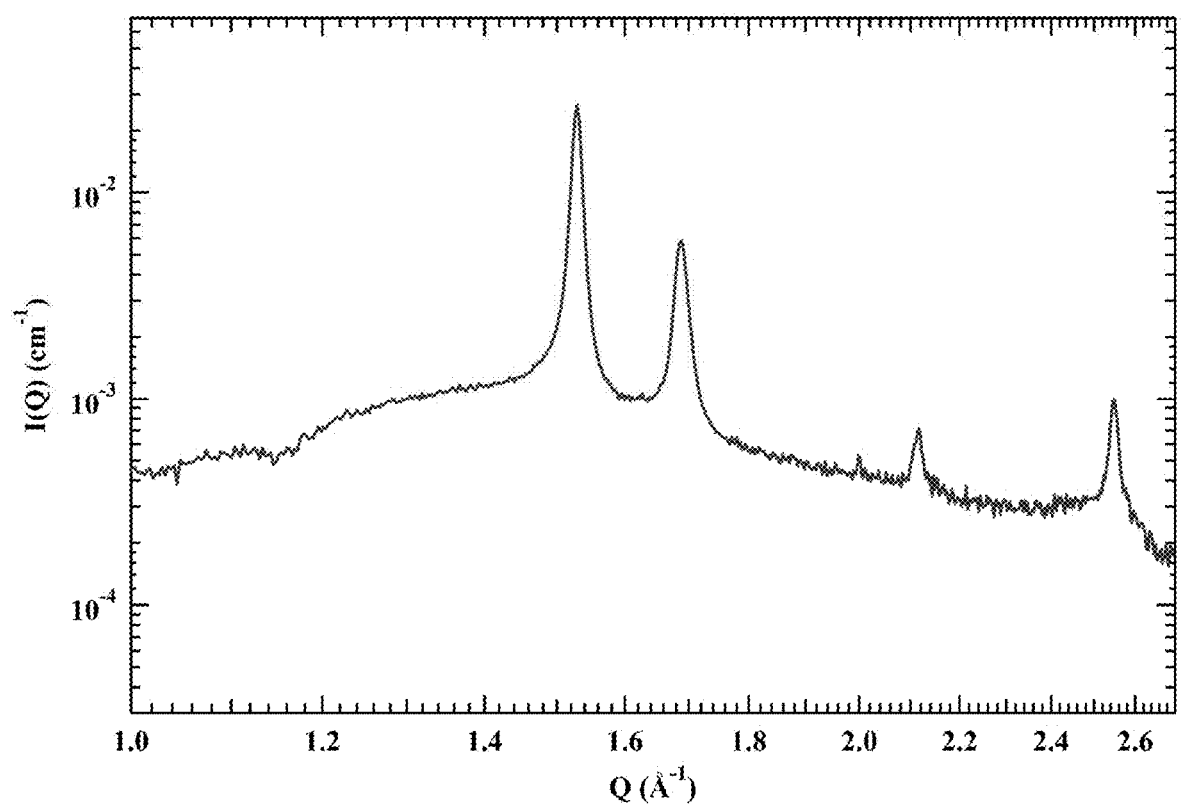
FIG. 15 illustrates a WAXS pattern of hydrogenated ABA triblock polymer backbone—PCMS-PE-PCMS (polychloromethylstyrene-polyethylene-polychloromethylstyrene)
Figure 16:
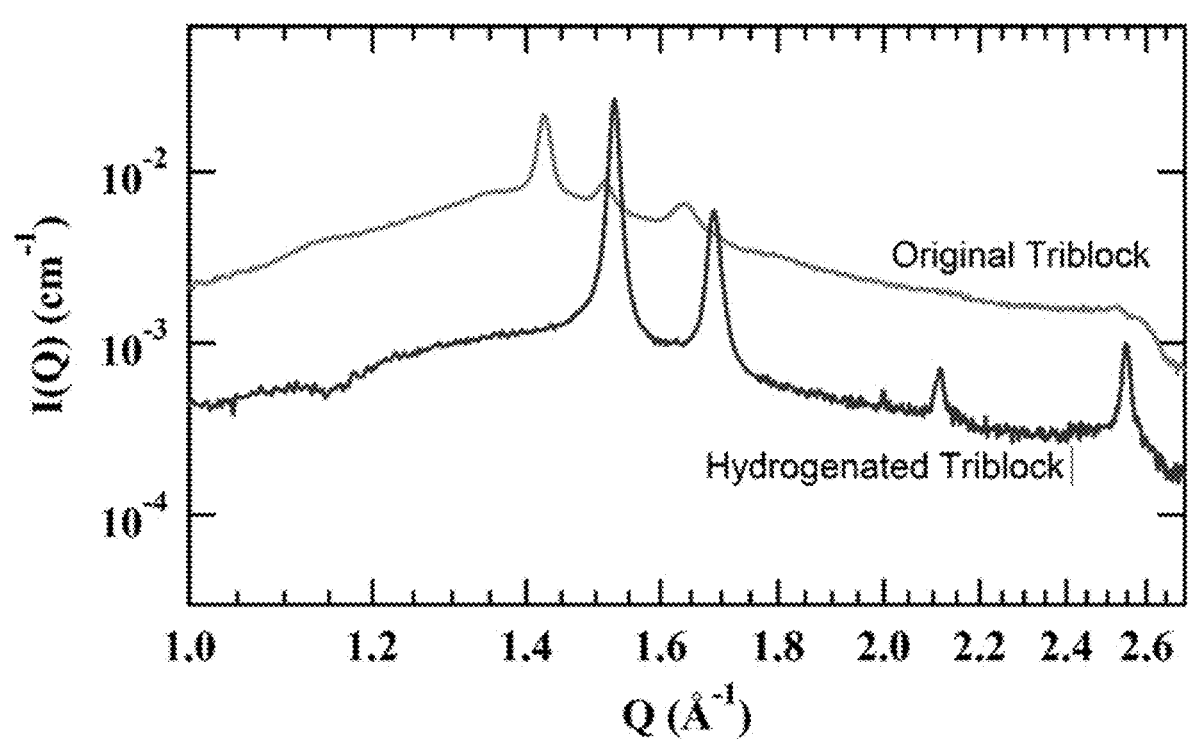
FIG. 16 illustrates a WAXS pattern overlay for comparison between hydrogenated ABA triblock polymer backbone PCMS-PE-PCMS (polychloromethylstyrene-polyethylene-polychloromethylstyrene) and unhydrogenated ABA triblock polymer backbone PCMS-PCOE-PCMS (polychloromethylstyrene-polycyclooctene-polychloromethylstyrene)

FIGS. 12-22 illustrate different properties of polymers made or used in the present invention. FIGS. 12-16 illustrate wide angle x-ray scattering patterns (WAXS). FIG. 12 illustrates a WAXS pattern of ABA triblock polymer backbone—PCMS-PCOE-PCMS (polychloromethylstyrene-polycyclooctene-polychloromethylstyrene). The peak q values align with known values for semi-crystalline polycyclooctene mid-block. FIG. 13 illustrates a WAXS pattern of ABA triblock polymer quaternized with BMPRD cation—PCMS-PCOE-PCMS[BMPRD] (polychloromethylstyrene-polycyclooctene-polychloromethylstyrene[benzyl-dimethylpiperidinium]). The peak q values align with known values for semi-crystalline polycyclooctene mid-block. FIG. 14 illustrates a WAXS pattern of ABA triblock polymer quaternized with BTMA cation—PCMS-PCOE-PCMS[BTMA] (polychloromethylstyrene-polycyclooctene-polychloromethylstyrene[benzyl-trimethylamine]). The peak q values align with known values for semi-crystalline polycyclooctene mid-block. FIG. 15 illustrates a WAXS pattern of hydrogenated ABA triblock polymer backbone—PCMS-PE-PCMS (polychloromethylstyrene-polyethylene-polychloromethylstyrene). The peak q values align with known values for semi-crystalline polyethylene mid-block. FIG. 16 illustrates a WAXS pattern overlay for comparison between hydrogenated ABA triblock polymer backbone PCMS-PE-PCMS (polychloromethylstyrene-polyethylene-polychloromethylstyrene) and unhydrogenated ABA triblock polymer backbone PCMS-PCOE-PCMS (polychloromethylstyrene-polycyclooctene-polychloromethylstyrene).

Figure 17:
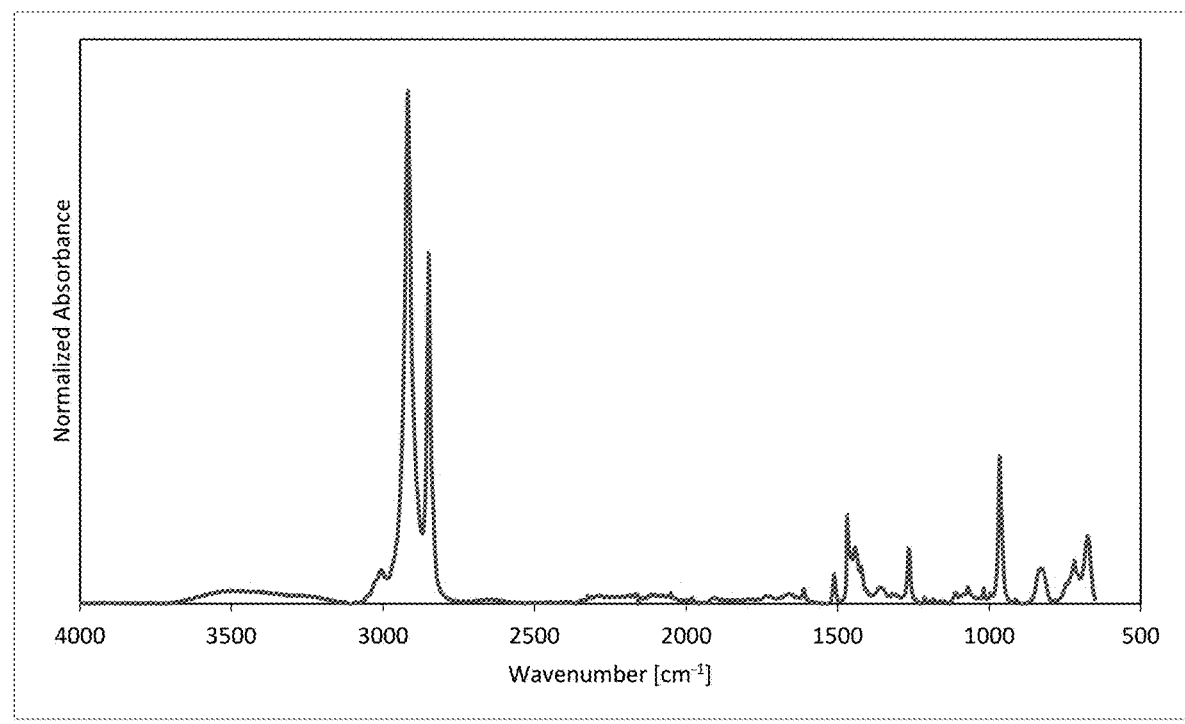
FIG. 17 illustrates a FTIR spectra of ABA triblock polymer backbone—PCMS-PCOE-PCMS (polychloromethylstyrene-polycyclooctene-polychloromethylstyrene)
Figure 18:
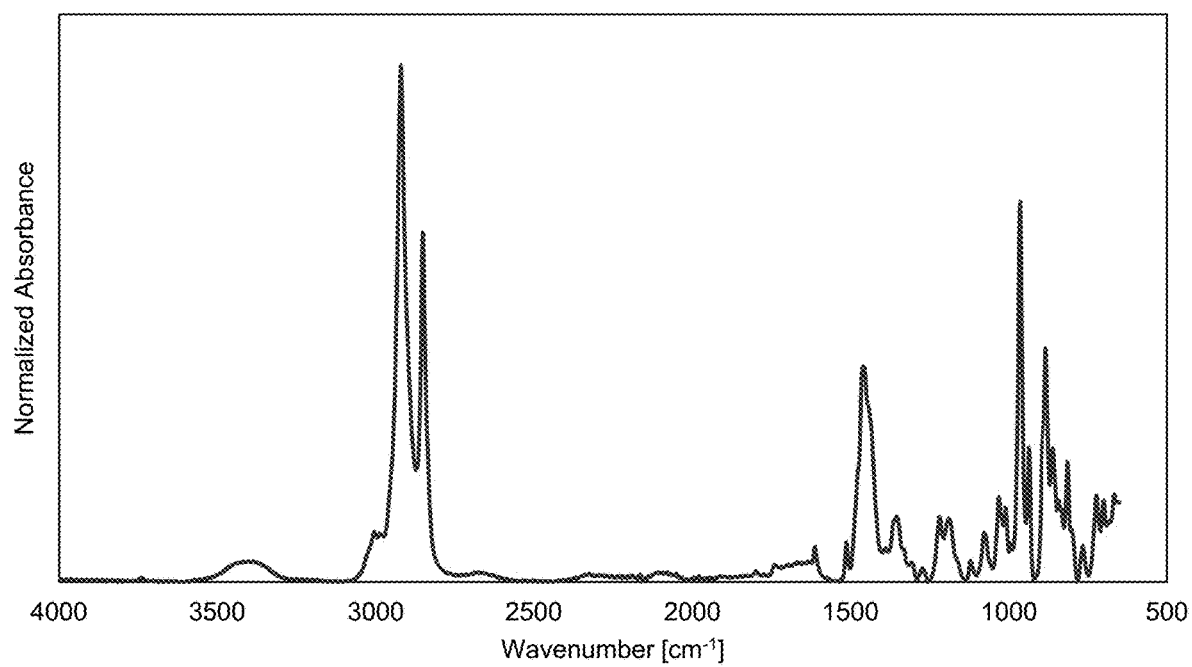
FIG. 18 illustrates a FTIR spectra of ABA triblock polymer quaternized with BMPRD cation—PCMS-PCOE-PCMS [BMPRD] (polychloromethylstyrene-polycyclooctene-polychloromethylstyrene[benzyl-dimethylpiperidinium])
Figure 19:
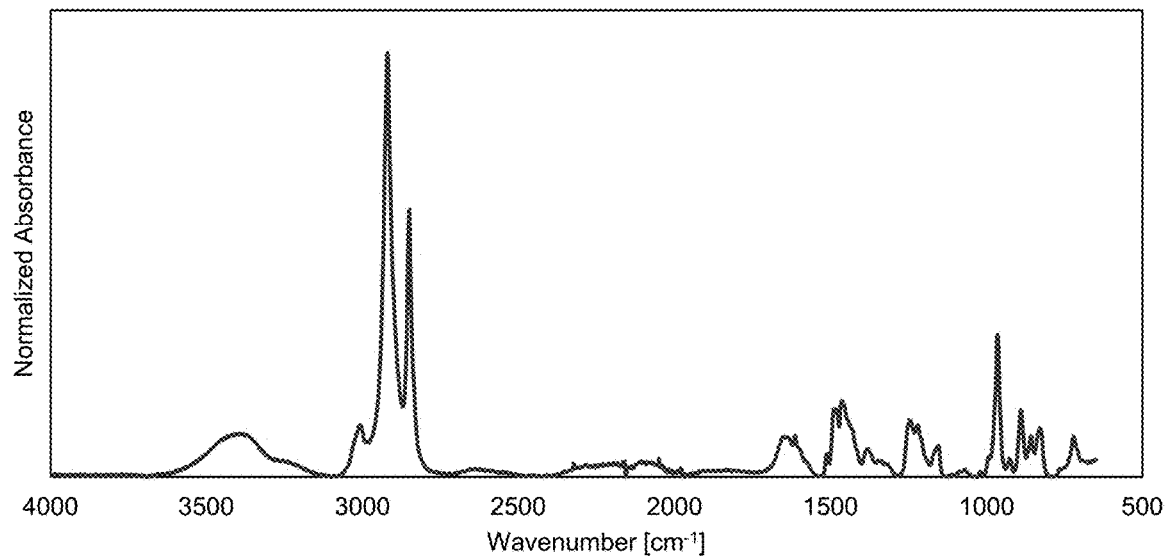
FIG. 19 illustrates a FTIR spectra of ABA triblock polymer quaternized with BTMA cation—PCMS-PCOE-PCMS [BTMA] (polychloromethylstyrene-polycyclooctene-polychloromethylstyrene[benzyl-trimethylamine])
Figure 20:
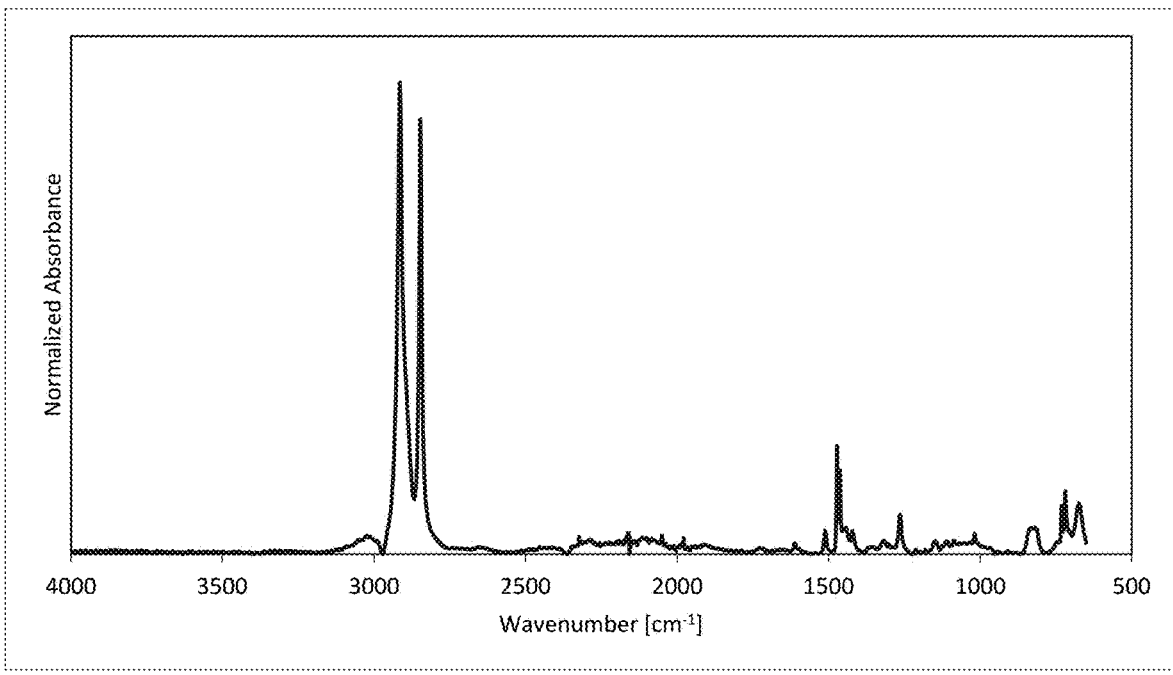
FIG. 20 illustrates a FTIR spectra of hydrogenated ABA triblock polymer backbone—PCMS-PE-PCMS (polychloromethylstyrene-polyethylene-polychloromethylstyrene)
Figure 21:
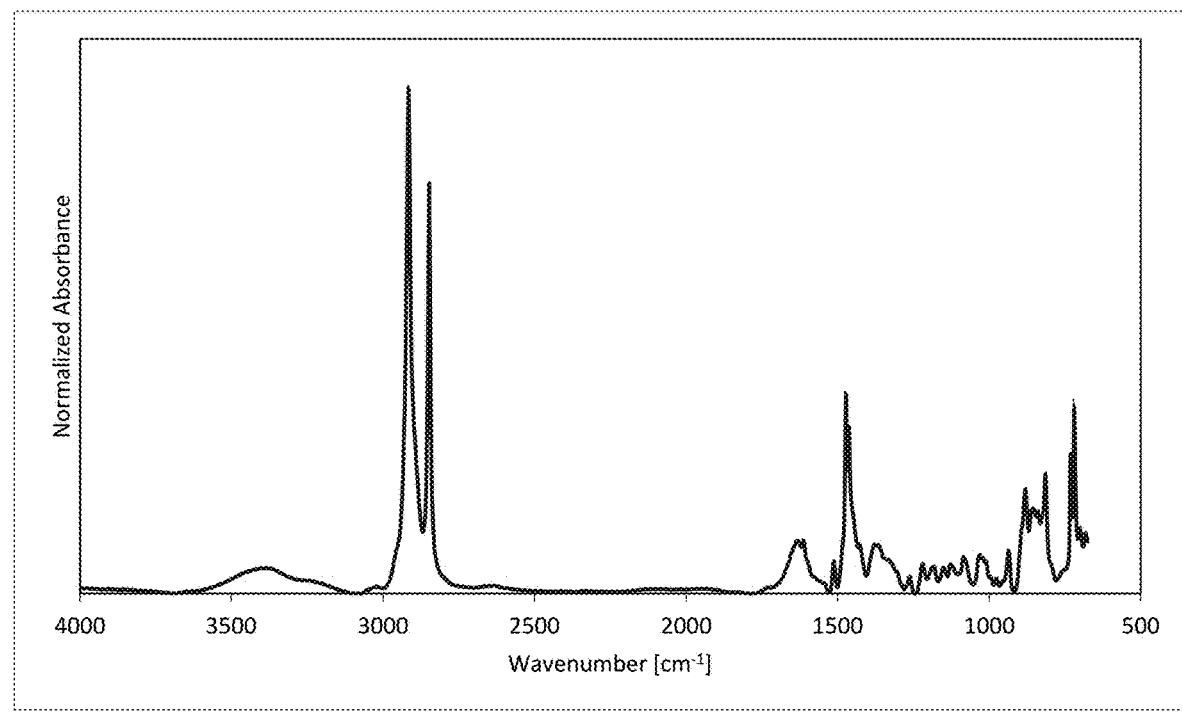
FIG. 21 illustrates a FTIR spectra of hydrogenated ABA triblock polymer quaternized with BMPRD cation—PCMS-PE-PCMS [BMPRD] (polychloromethylstyrene-polyethylene-polychloromethylstyrene[benzyl-dimethylpiperidinium])
Figure 22:
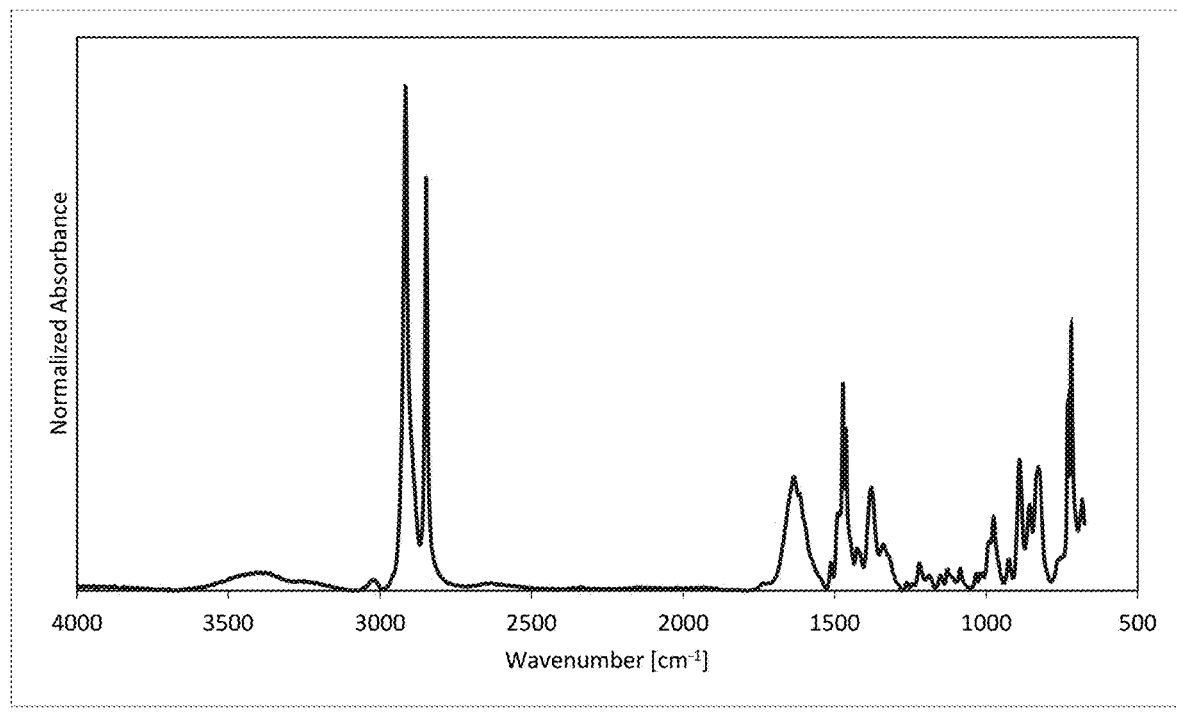
FIG. 22 illustrates a FTIR spectra of hydrogenated ABA triblock polymer quaternized with BTMA cation—PCMS-PE-PCMS [BTMA] (polychloromethylstyrene-polyethylene-polychloromethylstyrene[benzyl-trimethylamine])

FIGS. 17-22 illustrate FTIR spectra graphs. FIG. 17 illustrates a FTIR spectra of ABA triblock polymer backbone—PCMS-PCOE-PCMS (polychloromethylstyrene-polycyclooctene-polychloromethylstyrene). FIG. 18 illustrates a FTIR spectra of ABA triblock polymer quaternized with BMPRD cation—PCMS-PCOE-PCMS [BMPRD] (polychloromethylstyrene-polycyclooctene-polychloromethylstyrene[benzyl-dimethylpiperidinium]). FIG. 19 illustrates a FTIR spectra of ABA triblock polymer quaternized with BTMA cation—PCMS-PCOE-PCMS[B TMA] (polychloromethylstyrene-polycyclooctene-polychloromethylstyrene[benzyl-trimethylamine]). FIG. 20 illustrates a FTIR spectra of hydrogenated ABA triblock polymer backbone—PCMS-PE-PCMS (polychloromethylstyrene-polyethylene-polychloromethylstyrene). FIG. 21 illustrates a FTIR spectra of hydrogenated ABA triblock polymer quaternized with BMPRD cation—PCMS-PE-PCMS [BMPRD] (polychloromethylstyrene-polyethylene-polychloromethylstyrene [benzyl-dimethylpiperidinium]). FIG. 22 illustrates a FTIR spectra of hydrogenated ABA triblock polymer quaternized with BTMA cation—PCMS-PE-PCMS[BTMA] (polychloromethylstyrene-polyethylene-polychloromethylstyrene [benzyl-trimethylamine]).

Ranges have been discussed and used within the forgoing description. One skilled in the art would understand that any sub-range within the stated range would be suitable, as would any number within the broad range, without deviating from the invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method of hydrogenating a triblock polymer, the method comprising:
   selecting a triblock polymer comprising a structure A-B-A, wherein unit A is selected from the group consisting of a halogenated polyvinyl benzyl or a halogenated polymethyl styrene; and the unit B is independently selected from the group consisting of a polyisoprene, a polycyclooctene, a polycycloocadiene, and a polycyclooctatriene;
   dissolving the triblock polymer and a ρ-toluenesulfonyl hydrazide in a solvent to form a solution;
   heating the solution to hydrogenate the triblock polymer forming a hydrogenated triblock polymer;
   precipitating the hydrogenated triblock polymer from the solvent of the solution;
   cleaning the hydrogenated triblock polymer to remove a hydrazine by-product;
   dissolving the hydrogenated triblock polymer in a second solution;
   applying the second solution to a substrate;
   evaporating the second solvent to form a film on the substrate;
   converting the unit A to a cationic polymer by quaternizing with a base.

2. The method of claim 1, wherein the base is selected from the group consisting of trimethyl amine, methylpyrolidine, methylpiperidine, hexyl pyrrolidine and hexylpiperidine.

3. The method of claim 1, wherein the halogen is chloride.

4. The method of claim 1, wherein the substrate is glass, polytetrafluoroethylene, polyether ether ketone, or polyimide.

* * * * *